(12) United States Patent
Yook et al.

(10) Patent No.: US 11,204,680 B2
(45) Date of Patent: *Dec. 21, 2021

(54) METHOD OF DIVIDING SCREEN AREAS AND MOBILE TERMINAL EMPLOYING THE SAME

(71) Applicant: Samsung Electronics Co., Ltd., Gyeonggi-do (KR)

(72) Inventors: Hyung Min Yook, Seoul (KR); Sung Sik Yoo, Gyeonggi-do (KR); Kang Won Lee, Gyeonggi-do (KR); Myeong Lo Lee, Seoul (KR); Young Ae Kang, Seoul (KR); Hui Chul Yang, Seoul (KR); Yong Ki Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,017

(22) Filed: Mar. 17, 2020

(65) Prior Publication Data
US 2020/0218430 A1 Jul. 9, 2020

Related U.S. Application Data

(63) Continuation of application No. 16/261,878, filed on Jan. 30, 2019, now Pat. No. 11,093,106, which is a
(Continued)

(30) Foreign Application Priority Data

Dec. 22, 2009 (KR) .......................... 10-2009-0128711

(51) Int. Cl.
*G06F 3/0481* (2013.01)
*G06F 3/0486* (2013.01)
(Continued)

(52) U.S. Cl.
CPC ........ *G06F 3/04817* (2013.01); *G06F 3/0481* (2013.01); *G06F 3/0486* (2013.01);
(Continued)

(58) Field of Classification Search
CPC .. G06F 3/04817; G06F 3/0481; G06F 3/0486; G06F 3/04886; G06F 3/1415;
(Continued)

(56) References Cited

U.S. PATENT DOCUMENTS 5,390,295 A  2/1995 Bates et al.
5,712,995 A  1/1998 Cohn
(Continued)

FOREIGN PATENT DOCUMENTS

CN  1344989 A  4/2002
CN  1458576 A  11/2003
(Continued)

OTHER PUBLICATIONS

European Search Report dated Dec. 23, 2020.

*Primary Examiner* — Tuyetlien T Tran
(74) *Attorney, Agent, or Firm* — Cha & Reiter, LLC

(57) ABSTRACT

A method of supporting divided screen areas and a mobile terminal employing the same are disclosed. The method includes: generating input signals for one of sequentially and simultaneously activating a plurality of user functions; activating the user functions according to generated input signals; dividing a screen into divided screen areas that correspond to activated user functions; and outputting functional view areas associated with the activated user functions to the corresponding divided screen areas.

10 Claims, 18 Drawing Sheets

Related U.S. Application Data continuation of application No. 13/972,291, filed on Aug. 21, 2013, now Pat. No. 10,209,858, which is a continuation of application No. 12/728,357, filed on Mar. 22, 2010, now abandoned.

(60) Provisional application No. 61/163,259, filed on Mar. 25, 2009.

(51) Int. Cl.
*G06F 3/0488* (2013.01)
*G06F 3/14* (2006.01)
*G09G 5/14* (2006.01)

(52) U.S. Cl.
CPC ........ *G06F 3/04886* (2013.01); *G06F 3/1415* (2013.01); *G06F 3/1431* (2013.01); *G09G 5/14* (2013.01); *G06F 2203/04803* (2013.01); *G09G 2340/045* (2013.01); *G09G 2340/0407* (2013.01); *G09G 2340/0414* (2013.01); *G09G 2340/0421* (2013.01); *G09G 2340/0442* (2013.01); *G09G 2340/0464* (2013.01); *G09G 2340/0471* (2013.01); *G09G 2340/0478* (2013.01)

(58) Field of Classification Search
CPC ........ G06F 3/1431; G06F 2203/04803; G09G 5/14; G09G 2340/0407; G09G 2340/0414; G09G 2340/0421; G09G 2340/0442; G09G 2340/045; G09G 2340/0464; G09G 2340/0471; G09G 2340/0478

See application file for complete search history.

(56) References Cited

U.S. PATENT DOCUMENTS

| | | | |
|---|---|---|---|
| 5,847,706 A | 12/1998 | Kingsley | |
| 5,920,315 A | 7/1999 | Santos-Gomez | |
| 6,008,809 A | 12/1999 | Brooks | |
| 6,310,631 B1 | 10/2001 | Cecco et al. | |
| 6,686,852 B1 | 2/2004 | Guo | |
| 7,437,678 B2 | 10/2008 | Awada et al. | |
| 7,802,206 B1 | 9/2010 | Davis et al. | |
| 8,612,883 B2 | 12/2013 | Louch et al. | |
| 8,756,516 B2 | 6/2014 | Singh et al. | |
| 2003/0076362 A1 | 4/2003 | Terada | |
| 2004/0056903 A1 | 3/2004 | Sakai | |
| 2004/0139435 A1 | 7/2004 | Cui et al. | |
| 2004/0222942 A1 | 11/2004 | Hayashi et al. | |
| 2005/0022135 A1 | 1/2005 | de Waal | |
| 2005/0108655 A1 | 5/2005 | Andrea et al. | |
| 2005/0235220 A1 | 10/2005 | Duperrouzel et al. | |
| 2006/0015818 A1* | 1/2006 | Chaudhri | G06F 3/0484 715/779 |
| 2007/0044039 A1 | 2/2007 | Amadio et al. | |
| 2007/0046628 A1 | 3/2007 | Lee et al. | |
| 2007/0050724 A1 | 3/2007 | Lee et al. | |
| 2007/0120832 A1 | 5/2007 | Saarinen et al. | |
| 2007/0157160 A1 | 7/2007 | Arend et al. | |
| 2007/0192726 A1 | 8/2007 | Kim et al. | |
| 2007/0245256 A1* | 10/2007 | Boss | G06F 3/0481 715/768 |
| 2007/0265031 A1 | 11/2007 | Koizumi et al. | |
| 2007/0266135 A1 | 11/2007 | Friedland et al. | |
| 2007/0271366 A1 | 11/2007 | Demers et al. | |
| 2008/0024666 A1 | 1/2008 | Sudo et al. | |
| 2008/0066008 A1 | 3/2008 | Jeng | |
| 2008/0115081 A1 | 5/2008 | Sankaravadivelu et al. | |
| 2008/0119237 A1 | 5/2008 | Kim | |
| 2008/0172609 A1 | 7/2008 | Rytivaara | |
| 2008/0195961 A1* | 8/2008 | Bae | G06F 3/0488 715/769 |
| 2008/0198141 A1* | 8/2008 | Lee | G06F 3/04883 345/173 |
| 2008/0214239 A1 | 9/2008 | Hashimoto et al. | |
| 2008/0218533 A1 | 9/2008 | Goto et al. | |
| 2008/0320396 A1 | 12/2008 | Mizrachi et al. | |
| 2009/0077192 A1 | 3/2009 | Nishibayashi et al. | |
| 2009/0228820 A1* | 9/2009 | Kim | G06F 3/04886 715/769 |
| 2009/0288036 A1 | 11/2009 | Osawa et al. | |
| 2010/0066698 A1 | 3/2010 | Seo | |
| 2010/0081475 A1* | 4/2010 | Chiang | H04M 1/72403 455/564 |
| 2010/0088634 A1 | 4/2010 | Tsuruta et al. | |
| 2010/0146431 A1 | 6/2010 | Raji et al. | |
| 2010/0214278 A1 | 8/2010 | Miura | |
| 2010/0293501 A1 | 11/2010 | Russ et al. | |

FOREIGN PATENT DOCUMENTS

| | | |
|---|---|---|
| CN | 101352057 A | 1/2009 |
| EP | 1 923 778 A2 | 5/2008 |
| EP | 2166437 A2 | 3/2010 |
| JP | 10-260784 A | 9/1998 |
| JP | 2001-92670 A | 4/2001 |
| JP | 2004-46796 A | 2/2004 |
| JP | 2006-73015 A | 3/2006 |
| JP | 2006-115213 A | 4/2006 |
| JP | 2008-117181 A | 5/2008 |
| JP | 2008-134348 A | 6/2008 |
| JP | 2008-217555 A | 9/2008 |
| KR | 10-2005-0017132 A | 2/2005 |
| KR | 10-0478920 B1 | 3/2005 |
| KR | 10-0650257 B1 | 11/2006 |
| KR | 10-0695080 B1 | 3/2007 |
| KR | 10-0959796 B1 | 5/2010 |
| WO | 2008/084066 A1 | 7/2008 |
| WO | 2008/090902 A1 | 7/2008 |
| WO | 2009/017175 A1 | 2/2009 |
| WO | 2009/028892 A2 | 3/2009 |

* cited by examiner

FIG. 3
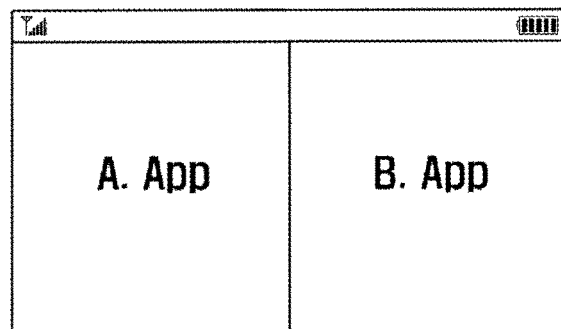
<301>
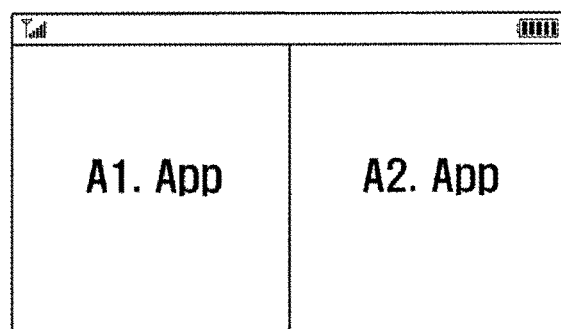
<302>
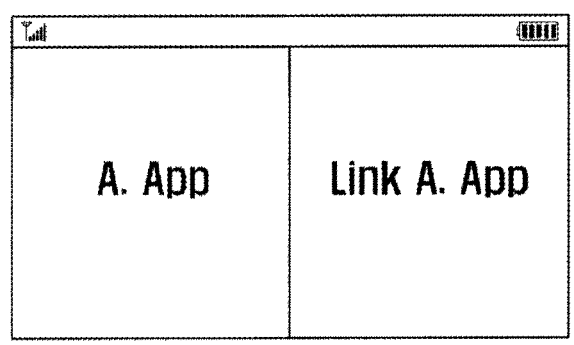
<303>
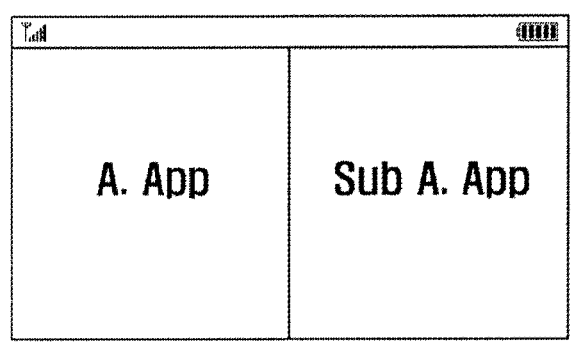
<304>

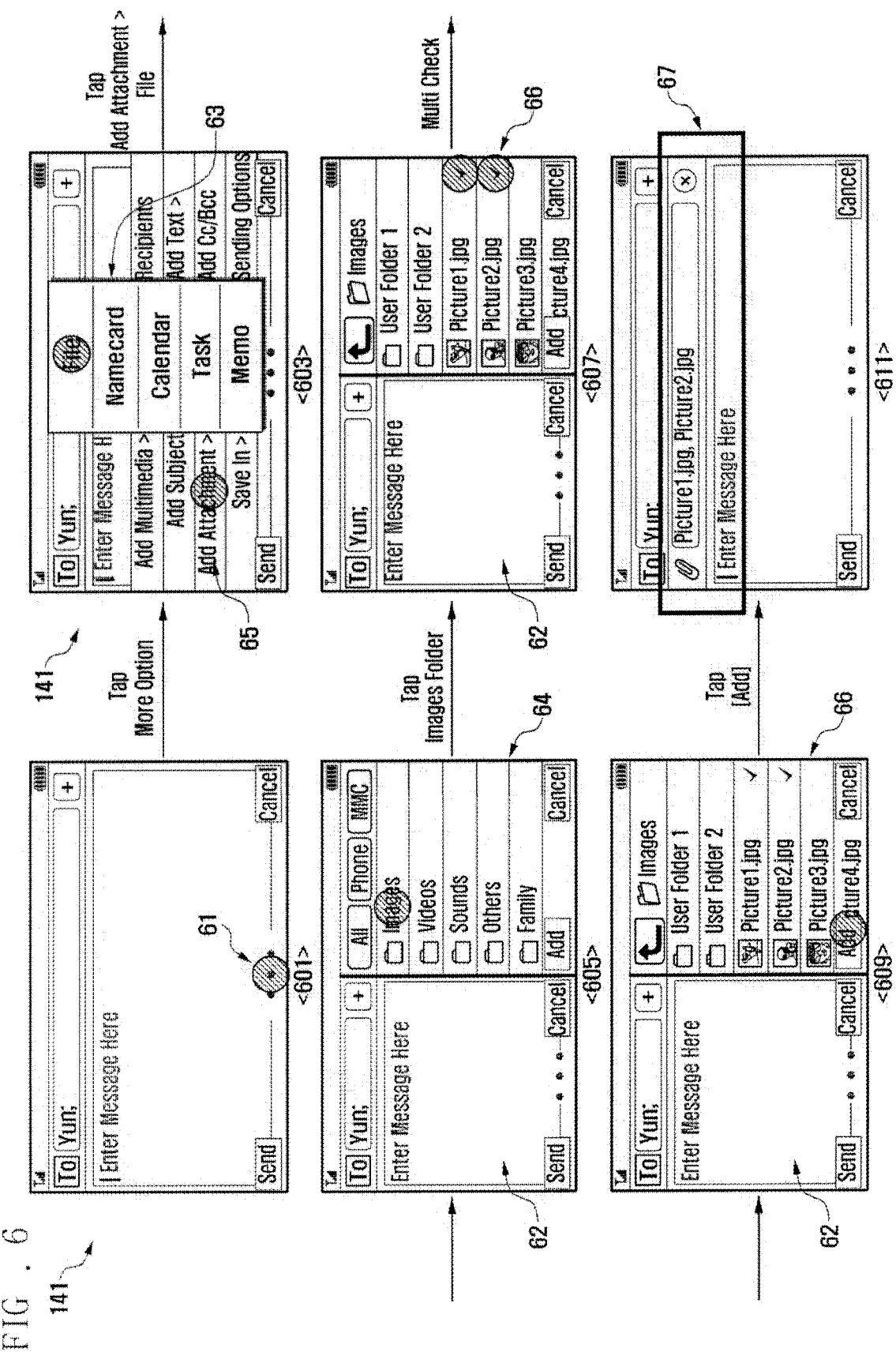

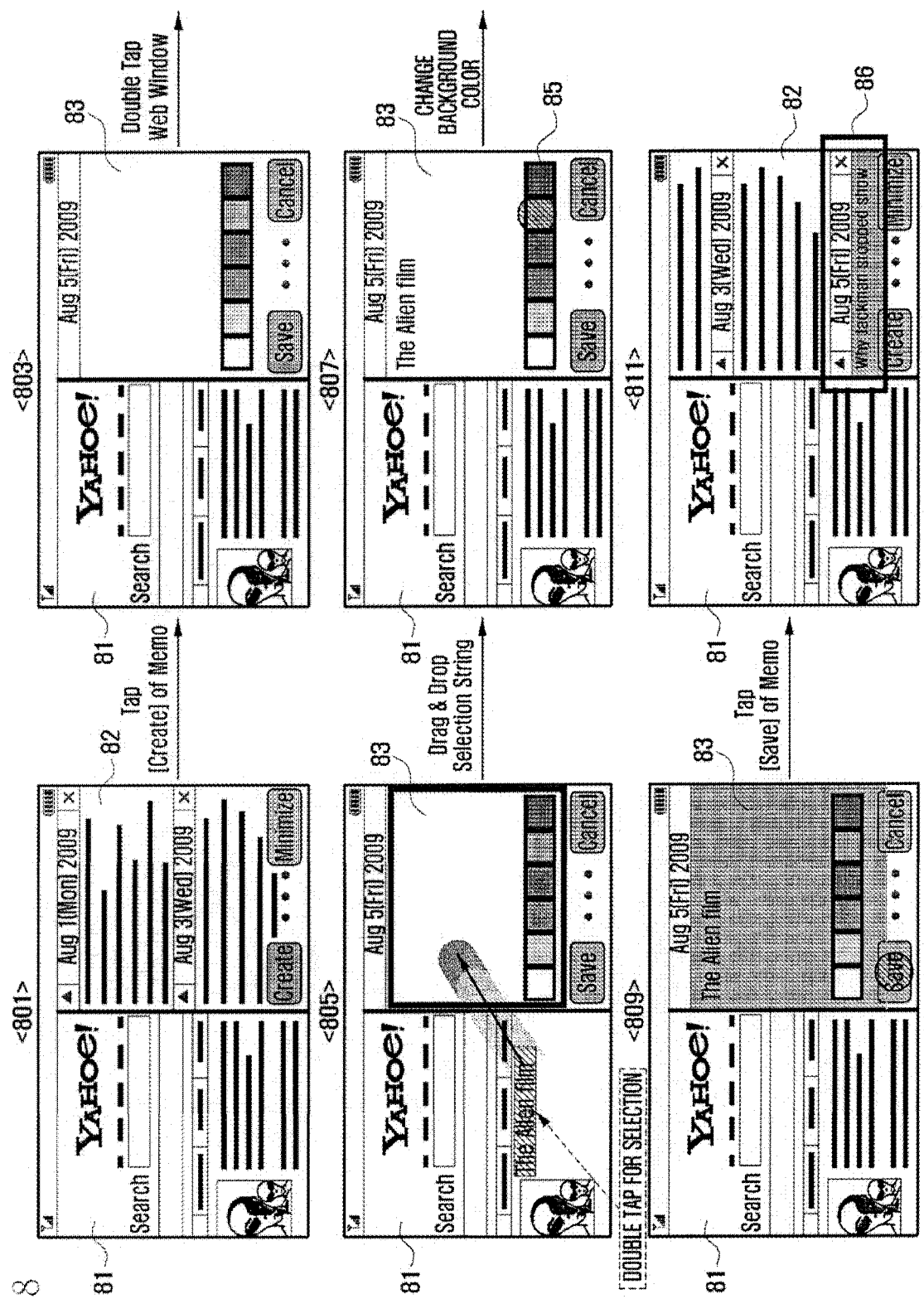

METHOD OF DIVIDING SCREEN AREAS AND MOBILE TERMINAL EMPLOYING THE SAME

CROSS RELATED APPLICATION(S)

This is a Continuation of U.S. patent application Ser. No. 16/261,878 filed on Jan. 30, 2019 which is a Continuation of U.S. patent application Ser. No. 13/972,291 filed on Aug. 21, 2013 and assigned U.S. Pat. No. 10,209,858 issued on Feb. 19, 2019 which is a Continuation application of an earlier U.S. patent application Ser. No. 12/728,357 filed on Mar. 22, 2010 which in turn claims the benefit of U.S. Provisional Application Ser. No. 61/163,259 filed Mar. 25, 2009, and also claims the benefit of priority under 35 U.S.C. § 119 from Korean patent application No. 10-2009-0128711 filed on Dec. 22, 2009, the contents of which are herein incorporated by reference in its entirety.

BACKGROUND

Field of the Invention

The present disclosure relates generally to a mobile terminal and, more particularly, to a method and mobile terminal that can divide the screen into individual divided screen areas and simultaneously present user functions on the individual divided screen areas.

Description of the Related Art

Recently, mobile terminals supporting mobility and various user functions have come into widespread use. To support user functions, mobile terminals can provide a variety of input means. For example, a mobile terminal can have a physical keypad for entering characters and numbers. To support portability, a mobile terminal can have a limited size. A mobile terminal can have a touch screen embedding a touch pad, in which case the screen size can be expanded by removing the keypad. Thanks to advances in display technology, screen sizes of mobile terminals have been significantly increased. Hence, there is a need for a method that enables a mobile terminal to effectively operate a large screen for user convenience.

SUMMARY

The present invention provides a method and mobile terminal having a screen that can divide the screen into a plurality of divided screen areas and simultaneously present user functions on each of the individual divided screen areas according to usage conditions.

In accordance with an exemplary embodiment of the present invention, there is provided a screen area dividing method for a mobile terminal, including: generating input signals for one of sequentially and simultaneously activating a plurality of user functions; activating the plurality of user functions according to the generated input signals; in accordance with the activated functions, dividing the screen into corresponding divided screen areas; and outputting functional view areas associated with the activated user functions to the corresponding divided screen areas.

In accordance with another exemplary embodiment of the present invention, there is provided a mobile terminal capable of supporting a plurality of divided screen areas, including: a storage unit for storage of a plurality of application programs that implement user functions; an input unit for generation of a plurality of input signals for one of sequential and simultaneous activation of user functions; a control unit for activation of user functions according to the plurality of generated input signals, and for output of functional view areas associated with the user functions to be on the plurality of divided screen areas; and a display unit for display of the functional view areas.

The present invention provides a divided screen area function comprising a plurality of divided screen areas such that a user can execute user functions using divided screen areas in an easy and effective manner.

BRIEF DESCRIPTION OF THE DRAWINGS

The features and advantages of the present invention will be more apparent from the following detailed description taken in conjunction with the accompanying drawings, in which:

FIG. 3 illustrates presentation of user functions on a plurality of divided screen areas, according to an exemplary embodiment of the present invention;

FIG. 6 illustrates a screen representation for a first example of user interaction, in an exemplary embodiment of the present invention;

FIG. 8 illustrates a screen representation for a third example of user interaction, in an exemplary embodiment of the present invention;

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein are omitted to avoid obscuring the subject matter of the present invention. Particular terms are defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes can be made and equivalents can be substituted for elements of the invention.

Figure 1:
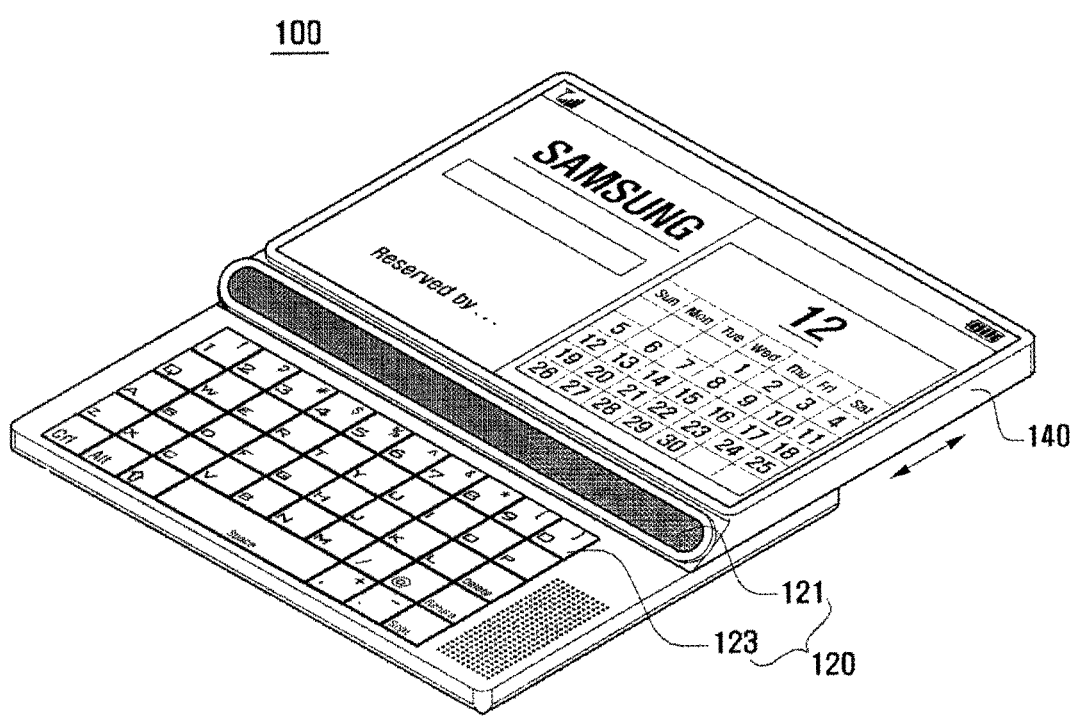
FIG. 1 illustrates an external appearance of a mobile terminal according to an exemplary embodiment of the present invention.
Figure 2:
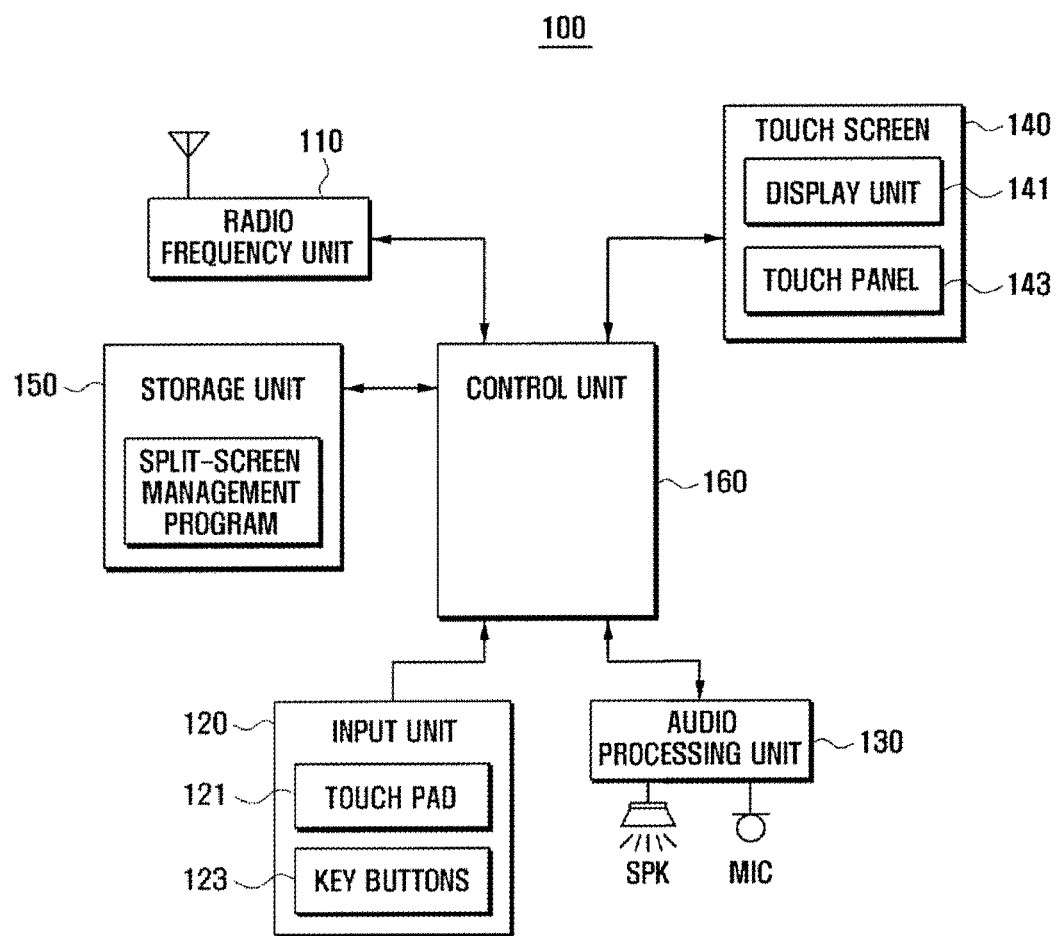
FIG. 2 is an illustration of an exemplary block diagram of the mobile terminal of FIG. 1.

FIG. 1 illustrates an external appearance of a mobile terminal 100 according to an exemplary embodiment of the present invention, and FIG. 2 illustrates an example of a block diagram of the mobile terminal 100.

Referring to FIG. 1 and FIG. 2, the mobile terminal 100 includes a radio frequency unit 110, an input unit 120, an audio processing unit 130, a touch screen 140, a storage unit 150, and a control unit 160. The mobile terminal 100 depicted in FIG. 1 is of a slide type. However, the present invention is not limited thereto. For example, the mobile terminal 100 composed of an upper slide body and a lower slide body can be transformed into a bar type mobile terminal by removing the lower slide body having the input unit 120. The touch screen 140 with a key map can act as an input means for the bar type mobile terminal.

The mobile terminal 100 having the above configuration can activate a screen area management program stored in the storage unit 150 in response to a user request, divide the screen into divided screen areas if necessary, and output functional view areas related to activated user functions on the individual divided screen areas. The mobile terminal 100 can support information exchange between the functional view areas and perform subsequent operations using the exchanged information. Next, each component of the mobile terminal 100 is described in more detail.

The radio frequency unit 110 establishes a communication channel for voice, video and data communication under the control of the control unit 160. That is, the radio frequency unit 110 establishes a communication channel for a voice call, a data call and a video call to a mobile communication system. To achieve this, the radio frequency unit can include a radio frequency transmitter for upconverting the frequency of a signal to be transmitted and amplifying the signal, and a radio frequency receiver for low-noise amplifying a received signal and downconverting the frequency of the received signal. For effective operation of the radio frequency unit 110, the mobile terminal can display various information items including a phonebook on the display unit 141. If the mobile terminal 100 is not designed to support mobile communication, the radio frequency unit 110 can be eliminated from the configuration. The functional view area related to the radio frequency unit 110 can be displayed on one of divided screen areas. For example, in response to a signal for one of an outgoing call and an incoming call requiring activation of the radio frequency unit 110, the mobile terminal 100 can divide the screen of the display unit 141 into a plurality of divided screen areas, and output a functional view area related to a user function on one divided screen area and output a functional view area related to operation of the radio frequency unit 110 on another divided screen area.

The input unit 120 includes a plurality of alphanumeric and function keys for inputting alphanumeric information and for setting various functions. The function keys can include functions selected from the group consisting of direction, side, and shortcut keys associated with specific functions. In particular, as illustrated in FIG. 1, the input unit 120 can include a touch pad 121 near the display unit 141 on an upper slide body, and a plurality of key buttons 123 on a lower slide body slidable under the upper slide body. The touch pad 121 arranged at the touch screen 140 can generate an input signal corresponding to a touch of the user and send the input signal to the control unit 160. The plurality of key buttons 123 are placed on the front of the lower slide body, and can be arranged in a plurality of forms like a keyboard. The plurality of key buttons 123 can also be arranged on a metal keypad.

The audio processing unit 130 includes a speaker SPK for outputting incoming and outgoing audio data during a call and for outputting audio data contained in any of received messages and stored in the storage unit 150, and a microphone MIC for collecting an audio signal such as a voice signal during a call. The audio processing unit 130 can generate a sound alert indicating formation of divided screen areas and output the audio component of functional view areas displayed in the divided screen areas. When each functional view area displayed in the divided screen areas contains audio data, the audio processing unit 130 can output audio data related to a particular divided screen area or simultaneously output audio data related to all the divided screen areas, according to any of user settings and user selections. The audio processing unit 130 can not generate a sound alert indicating formation of divided screen areas according to user settings.

The touch screen 140 includes a display unit 141 and a touch panel 143. The touch panel 143 can be arranged on the front of the display unit 141. The size of the touch screen 140 can depend on the size of the touch panel 143. For example, the touch screen 140 can be a full touch screen completely covering the front of the display unit 141.

The display unit 141 displays at least one of each of menus, information input by the user, and information to be provided to the user. For example, the display unit 141 can output a plurality of screens related to utilization of the mobile terminal 100, such as any screen selected from the group consisting of an idle screen, menu screen, message composition screen, and call handling screen. The display unit 141 can be implemented using any of liquid crystal display (LCD) devices and organic light emitting diodes (OLED). As described before, the touch screen 140 including the touch panel 143 can act as an input means. In particular, under the control of the control unit 160, the display unit 141 can divide the screen into a plurality of divided screen areas and output functional view areas related to user functions to the individual divided screen areas. Outputting functional view areas to the divided screen areas is described later in more detail.

The touch panel 143 is installed on the display unit 141, and can generate a touch event corresponding to a touch on one of a specific image and item displayed on the display unit 141. For example, in response to a touch on a displayed instrument image, the touch panel 143 generates a corresponding touch event and sends the touch event to the control unit 160. A displayed image or item can be associated with a user function.

The storage unit 150 can store any of application programs related to the present invention, and key maps and menu maps for the touch screen capability. The key maps can correspond to various keyboards including any of a 3*4 keyboard and a Qwerty keyboard, and can include a control key map for controlling execution of an activated application program. The menu maps can include any of a menu map for controlling execution of an activated application program, and a menu map related to the menus of the mobile terminal 100. The storage unit 150 can include any of a program zone and a data zone.

The program zone can store any of an operating system (OS) for booting and operating the mobile terminal 100, application programs for reproduction of various files, application programs for call-related functions, a browser for accessing a web server, application programs for playback of MP3 data, and application programs for viewing still images and moving images. In particular, the storage unit 150 stores a screen area management program.

The screen area management program can be loaded on the control unit 160 in response to activation of a particular user function. The screen area management program is a control program that, when divided screen area formation is requested during execution of a user function, divides the screen of the display unit 141 into a plurality of divided screen areas and outputs functional view areas related to active user functions to the individual divided screen areas. To achieve this, the screen area management program can include any of a routine for detecting an input signal generated during execution of a user function, a routine for determining whether an input signal corresponds to a condition preset for divided screen area formation, and a routine for dividing the screen if the input signal corresponds to a condition preset for divided screen area formation. The screen area management program can further include any of an output routine for outputting two functional view areas related to a user function and the input signal to the corresponding divided screen areas of the display unit 141, and an action routine for performing any of inserting, setting, searching, copying, moving, and invoking one of a data item in and a data item between the two displayed functional view areas for information exchange. The output routine can include any of a subroutine for reformatting the functional view area related to the user function according to the corresponding divided screen area, and a subroutine for adjusting the functional view area related to the input signal according to the corresponding divided screen area. The action routine is described in more detail later.

The data zone is an area that stores data generated by the use of the mobile terminal 100, and can store any of phonebook information, at least one icon associated with widgets, and at least one content. The data zone can store user data input through the touch screen 140. In particular, the data zone can temporarily store screen data related to user functions, and descriptive information regarding divided screen areas after divided screen area formation in response to a specific input signal.

The control unit 160 controls supply of power to the components of the mobile terminal 100 for initialization, and controls the components to provide a user interface for supporting divided screen areas and to perform requested operations. In particular, the control unit 160 controls an operation to demarcate the display unit 141 into two areas according to properties of activated user functions, and outputs functional view areas related to the user functions to the two areas.

Referring to FIG. 3, when a first user function and a second user function, which are independent of each other, are activated at one of the same time and in sequence, as illustrated in screen 301, the control unit 160 can control the display unit 141 to divide the screen into two areas, and cause a functional view area A.App for the first user function to be displayed on one area and cause a functional view area B.App for the second user function to be displayed on the other area. The functional view area A.App and the functional view area B.App can include an image and a text string depending upon the first and second user functions. For example, if the first user function is related to music playback, the functional view area A.App can include a control key map for controlling music playback and an image depicting the music file being played back. If the second user function is related to message composition, the functional view area B.App can include a key map and a message composition view area for composing a message.

When two instances of a user function are activated, the control unit 160 can control the display unit 141 to divide the screen into two areas, and cause two functional view areas to be displayed on the corresponding areas as illustrated in screen 302. For example, when a first user function being a message composition function is activated, the control unit 160 can control the display unit 141 to display one of a message composition view area in a full screen format and to display a message composition view area and a key map in a full screen format. Thereafter, when the user activates a second user function being the message composition function, the control unit 160 controls the display unit 141 to divide the screen into two areas, to display a functional view area A1.App (i.e., resized message composition view area) for the first user function on one area, and to display a functional view area A2.App for the second user function on the other area. For another example, when the user activates an application requiring two Web connections, the control unit 160 can control the display unit 141 to display a functional view area A1.App as to one Web connection and a functional view area A2.App as to the other Web connection on the corresponding areas.

When related user functions are activated, the control unit 160 can control the display unit 141 to divide the screen into two areas, and cause two functional view areas to be displayed on the corresponding areas as illustrated in screen 303. For example, when the user activates a message composition function first and then activates a file search function for message composition, the control unit 160 can control the display unit 141 to divide the screen into two areas, to display a functional view area A.App as to the message composition function on one area, and to display a functional view area LinkA.App as to the file search function on the other area. Hence, the user can compose a message using the functional view area A.App displayed on one area and can find and attach a necessary file using the functional view area LinkA.App displayed on the other area.

When a user function is activated first and then a sub function thereof is activated, the control unit 160 can control the display unit 141 to divide the screen into two areas, and cause two functional view areas to be displayed on the corresponding areas as illustrated in screen 304. For example, when a message search function is activated for received messages, the control unit 160 can control the display unit 141 to display a list of all received messages in a full screen format. Thereafter, when a user input signal is generated to select and view a received message of the list, the control unit 160 can activate a sub user function for selecting and viewing a desired received message. Here, the control unit 160 can control the display unit 141 to divide the screen into two areas, to display a functional view area A.App as to the message search function on one area, and to display a functional view area SubA.App as to the message viewing function on the other area.

As described above, the control unit 160 can control the display unit 141 to divide the screen into different areas, and cause functional view areas associated with any of independent user functions, instances of the same user function, related user functions, and main and subordinate user functions, to be displayed on the corresponding areas.

Next, a description is given of divided screen area formation in connection with FIGS. 4A to 4E.

Figure 4A:
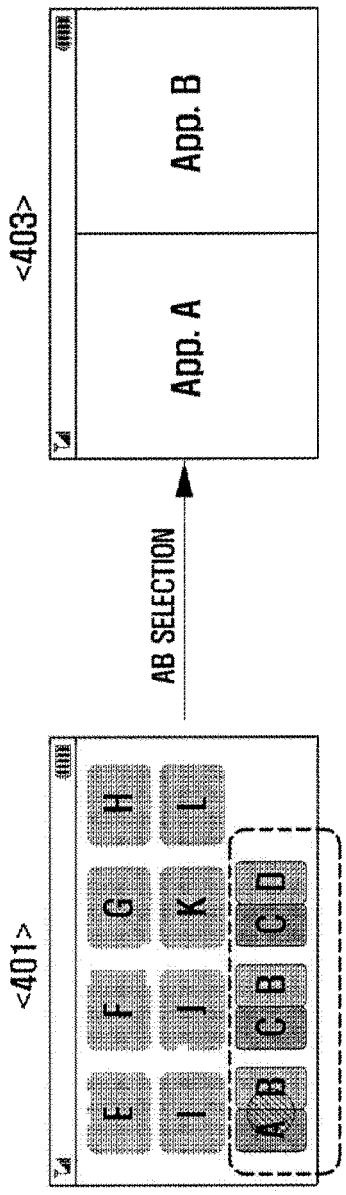
FIGS. 4A, 4B, 4C, 4D, and 4E illustrate splitting and merging of screens, according to an exemplary embodiment of the present invention.

Referring to FIG. 4A, the user of the mobile terminal 100 can generate an input signal to display a plurality of one of menu items and widget items. As illustrated in screen 401, the mobile terminal 100 can display a plurality of menu items on the screen in response to an input signal. The plurality of menu items can include a dual menu item, which is to be displayed on divided screen areas. Here, when a dual menu item is activated, the screen of the display unit 141 is divided into two areas and two functional view areas as to two menus are displayed on the two areas. A dual menu item can be one of created according to design settings and be created when the user combines two menu items together. The mobile terminal 100 can provide a special menu that enables the user to combine two selected menu items together into a dual menu item. In screen 401, menu items E, F, G, H, I, J, K and L are a single menu item, and menu items "AB", "CB" and "CD" are a dual menu items.

When the user selects a dual menu item "AB" in screen 401, the mobile terminal 100 can activate application programs related to the menu items A and B, display a functional view area App.A as to the application program related to the menu item A on a divided screen area, and display a functional view area App.B as to the application program related to the menu item B on the other divided screen area, as illustrated in screen 403. As described above, the mobile terminal 100 can provide a feature for setting a dual menu item and output a functional view area related to the dual menu item to the divided screen areas.

Figure 4B:
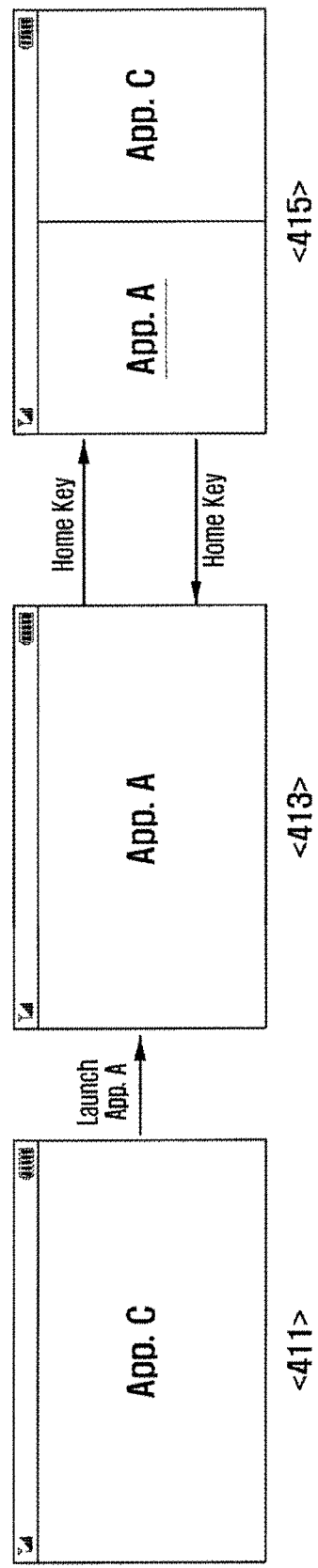

Referring to FIG. 4B, when the user generates an input signal to activate a menu 'C' or a function 'C', the mobile terminal 100 can display a functional view area App.C as to the menu 'C' or function 'C' on the screen, as illustrated in screen 411. Thereafter, when the user generates an input signal to activate a function 'A' in screen 411, the mobile terminal 100 can display a functional view area App.A as to the function 'A' on the display unit 141, as illustrated in screen 413. For example, when the user activates a Web browser, the mobile terminal 100 can access a Web server using a preset Web address and display a Web access view area received from the Web server as illustrated in screen 411. Thereafter, when the user generates an input signal to select an item having a link from the Web access view area, the mobile terminal 100 can display a linked Web access view area on the display unit 141, as illustrated in screen 413.

The mobile terminal 100 can provide simultaneous presentation of two pieces of data related by an event history. For example, when the user generates an input signal corresponding to one of a particular key and a touch event like the 'Home' key in screen 413, the mobile terminal 100 can simultaneously output two functional view areas App.C and App.A to the display unit 141 as illustrated in screen 415, where the functional view area App.C is related by an event history to the functional view area App.A. In this case, the mobile terminal 100 can control the display unit 141 to divide the screen into two areas, and cause functional view areas to be displayed on the corresponding areas. That is, the mobile terminal 100 can display the functional view area App.A (presented immediately before pressing the 'Home' key) on the left divided screen area, and display the functional view area App.C (presented in relation to the function 'C' before the function 'A') on the right divided screen area. The mobile terminal 100 can move a functional view area to another divided screen area in response to occurrence of, for example, a drag event. When the 'Home' key is pressed again during display of divided screen areas, the mobile terminal 100 can return to the previous screen as illustrated in screen 413. As described above, when two functional view areas are related to each other through an event history, the mobile terminal 100 can simultaneously present the two functional view areas on the divided screen areas.

Figure 4C:
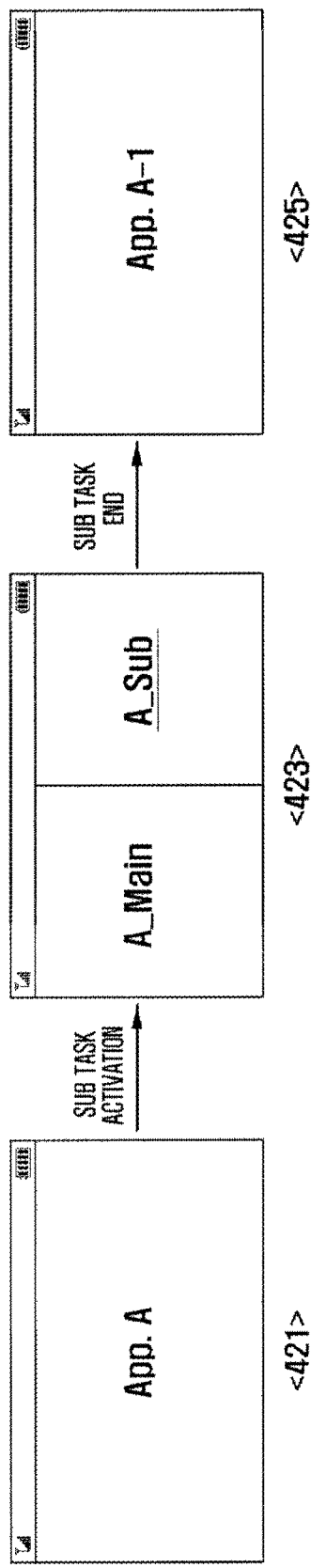

Referring to FIG. 4C, when the user generates an input signal to activate a function 'A', the mobile terminal 100 can display a functional view area App.A as to the function 'A' on the display unit 141, as illustrated in screen 421. Thereafter, when the user generates an input signal to activate a sub task of the function 'A' in screen 421, the mobile terminal 100 activates the sub task, and can display a functional view area A_Main as to the function 'A' on one divided screen area and display a functional view area A_Sub as to the sub task on the other divided screen area as illustrated in screen 423. Here, the functional view area A_Main in screen 423 is one of a resized and a simplified version of the functional view area App.A in screen 421. The divided screen areas to which the functional view area A_Main and functional view area A_Sub are output can be any of fixed, altered, and randomly determined according to user settings.

When the sub task A_Sub one of ends and is terminated by the user, the mobile terminal 100 can output a functional view area App.A-1 reflecting the result of the sub task A_Sub to the display unit 141 in a full screen format, as illustrated in screen 425.

As an example for the case in FIG. 4C, when the user generates an input signal to activate a message composition program, the mobile terminal 100 can display a functional view area App.A (a message composition view area) as to the message composition program on the screen, as illustrated in screen 421. Thereafter, when the user generates an input signal for finding an attached file, the mobile terminal 100 can output a functional view area A_Sub as to the file search function as illustrated in screen 423. Here, the functional view area App.A (message composition view area) in screen 421 can be one of resized and changed in attribute into the functional view area A_Main as illustrated in screen 423. Thereafter, when the user selects an image in the functional view area A_Sub and attaches the selected image to the functional view area A_Main, the mobile terminal 100 can output a functional view area App.A-1 as to a message with an attached image in a full screen format as illustrated in screen 425. When the user generates an input signal for ending file search, the mobile terminal 100 can return to screen 421. As described above, when a function and subordinate function are activated, the mobile terminal 100 can output functional view areas related to the function and subordinate function to divided screen areas.

Figure 4D:
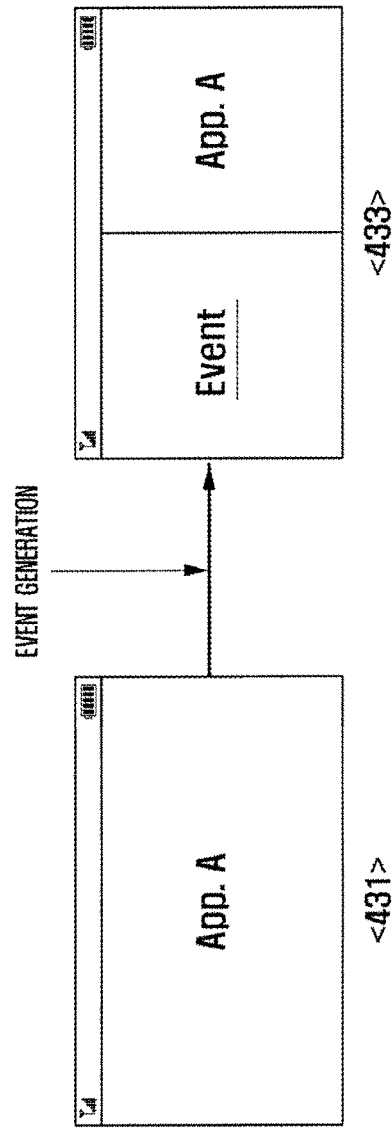

Referring to FIG. 4D, the user of the mobile terminal 100 can generate an input signal for activating a function 'A', the mobile terminal 100 can display a functional view area App.A as to the function 'A' on the display unit 141, as illustrated in screen 431. Thereafter, when an event corresponding to one of a schedule and a condition is generated, the mobile terminal 100 can activate an application program for handling the event and output a functional view area as to the event handling application program to the display unit 141. Here, as illustrated in screen 433, the mobile terminal 100 can display the functional view area App.A as to the function 'A' on one divided screen area through resizing, and display a functional view area Event as to the event handling application program on the other divided screen area.

As an example for the case in FIG. 4C, when the user generates an input signal to activate a function 'A' for moving image playback, the mobile terminal 100 can display a functional view area App.A as to moving image playback on the display unit 141 in a full screen format, as illustrated in screen 431. Thereafter, when an incoming call is received, the mobile terminal 100 can generate an alert for call reception, and output a functional view area related to call event handling to the display unit 141. Here, as illustrated in screen 433, the mobile terminal 100 can display the functional view area App.A as to the function 'A' on one divided screen area, and display a functional view area Event as to call event handling on the other divided screen area.

As depicted above, in response to reception of an incoming call, the mobile terminal 100 can output a functional view area related to call event handling to the display unit 141. In the case of a call event, as the user normally grips the mobile terminal 100 and moves it close to the user's face, the mobile terminal 100 can pause moving image playback and turn off the display unit 141 to save battery power. When the incoming call is ended, the mobile terminal 100 can return to screen 431.

In response to a schedule alert event, the mobile terminal 100 can output a functional view area (an alert message) related to schedule alert handling to the left divided screen area, as illustrated in screen 433. Here, as handling of a schedule alert event is not in conflict with playback of moving images, the functional view area related to playback of moving images can be retained. Options for playback of moving images including continue and pause can be set by the design and changed by the user. As described above, in response to occurrence of one of an external and internal event when a functional view area related to a user function is output in a full screen format, the mobile terminal can display the functional view area related to the event and the functional view area related to the user function on divided screen areas.

Figure 4E:
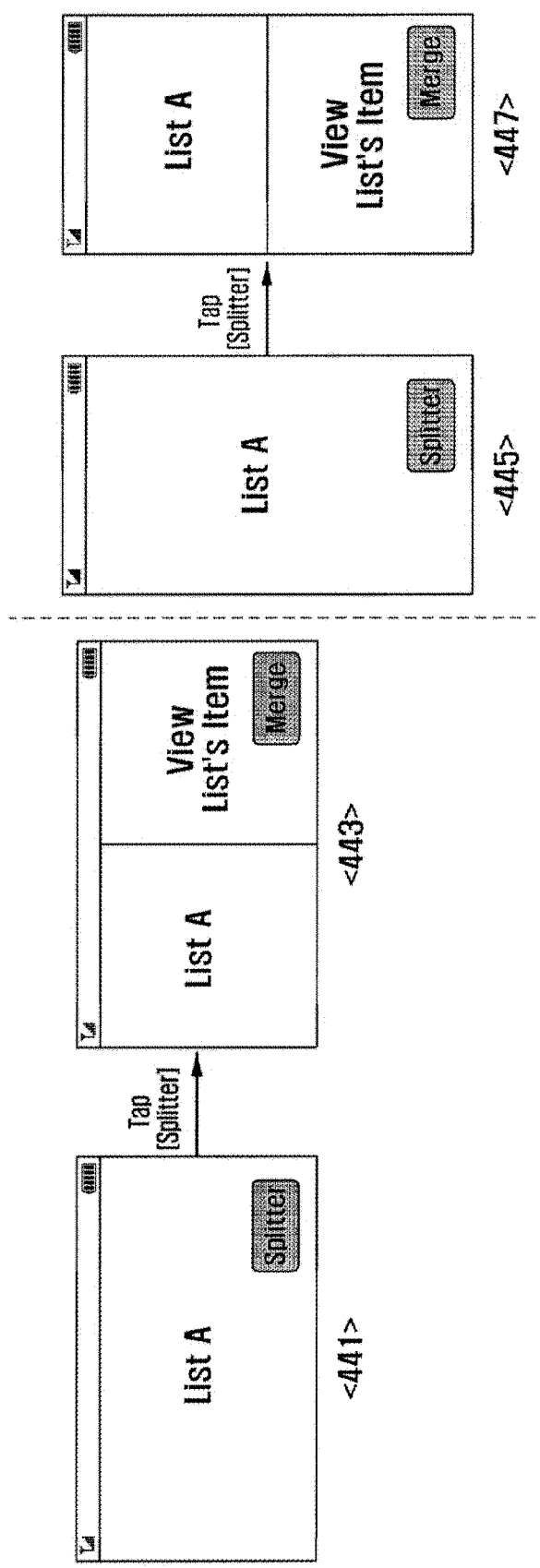

Referring to FIG. 4E, the user of the mobile terminal 100 can generate an input signal for activating a listing function, the mobile terminal 100 can display a functional view area "List A" as to the listing function on the display unit 141 and further display a splitter icon for divided screen areas, as illustrated in screen 441. Thereafter, when the user touches the splitter icon, the mobile terminal 100 can output a functional view area (items of List A) related to detailed viewing as illustrated in screen 443. That is, the mobile terminal 100 can divide the screens, output a resized functional view area "List A" to the display unit 141, and output the functional view area related to detailed viewing to the display unit 141 together with the functional view area "List A". Here, in the mobile terminal 100, divided screen areas can be formed in portrait mode as illustrated in screen 445 and screen 447.

The mobile terminal 100 can provide a "merge" icon for returning to the previous screen as illustrated in screen 445 or screen 447. When the user selects the "merge" icon, the mobile terminal 100 can return to screen 441 or screen 445.

Hereinabove, a description is given of divided screen area formation in connection with FIGS. 4A to 4E. Next, transitions between divided screen areas are described.

FIGS. 5A to 5D illustrate transitions between divided screen areas associated with user functions.

Figure 5A:
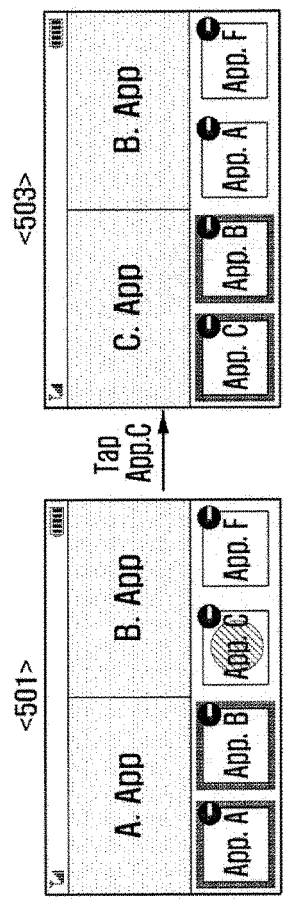
FIGS. 5A, 5B, 5C, and 5D illustrate transitions between screens associated with user functions, in an exemplary embodiment of the present invention.

Referring to FIG. 5A, when the user activates a file search function, the mobile terminal 100 can display a functional view area as to the file search function on the display unit 141. Here, when the user activates the file search function based on divided screen areas, the mobile terminal 100 can divide the screen into divided screen areas and output functional view areas related to files on the divided screen areas as illustrated in screen 501. For example, after display of dual menu items, the user can generate an input signal for selecting a dual menu item. Then, the mobile terminal 100 can output functional view areas related to the dual menu item on the divided screen areas as illustrated in screen 501. Alternatively, as described before in connection with FIG. 4, in response to activation of a user function, the mobile terminal 100 can output a functional view area related to the user function on the divided screen areas. The mobile terminal 100 can divide the screen of the display unit 141 into two divided screen areas, and output two functional view areas A.App and B.App related to the selected files on the divided screen areas. The mobile terminal 100 can further output a search view area, which can overlap with the divided screen areas, on the display unit 141. The search view area can be output in response to a given touch event occurring when a functional view area is displayed on the display unit 141, and can be removed from the display unit 141 after expiration of a preset time. The mobile terminal 100 can also divide the screen of the display unit 141 into three areas, and output a functional view area A.App, a functional view area B.App, and the search view area on the three areas, respectively. In the search view area, icons associated with the functional view area being currently displayed on the display unit 141, and icons associated with other files can be present. The icons associated with the functional view area being currently displayed can be highlighted to indicate the files being selected and output.

In screen 501, when the user generates an input signal for selecting an icon App.C, the mobile terminal 100 can output a functional view area C.App related to the icon App.C to the display unit 141 as illustrated in screen 503. During this process, the mobile terminal 100 can replace the functional view area A.App with the functional view area C.App. To output a new functional view area, the mobile terminal 100 can identify the oldest functional view area on display and replace the oldest functional view area with the new functional view area.

As described above, to support divided-screen area transition, the mobile terminal 100 can perform any one or more of display a separate search view area, select a desired icon in the search view area, and replace one functional view area being output with a functional view area related to the selected icon.

Figure 5B:
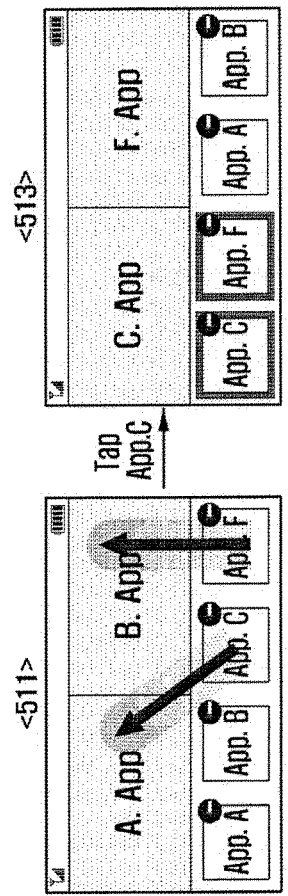

Referring to FIG. 5B, the mobile terminal 100 can also output a functional view area when the user selects a file in the search view area. To be more specific, as illustrated in screen 511, it is assumed that the mobile terminal 100 displays functional view areas A.App and B.App in response to selection of an icon App.A and icon App.B in the search view area. The user can select an icon App.C and move the icon App.C to the location where the functional view area A.App is displayed through touch and drag. The user can also select an icon App.F and move the icon App.F to the location where the functional view area B.App is displayed through touch and drag.

In response to the user actions, as illustrated in screen 513, the mobile terminal 100 can replace the functional view area A.App with a functional view area C.App related to the icon App.C, and replace the functional view area B.App with a functional view area F.App related to the icon App.F.

As described above, when the user selects an icon in the search view area and directly moves the selected icon to a desired location on the screen, the mobile terminal 100 can display a functional view area related to the selected icon at the desired location.

Figure 5C:
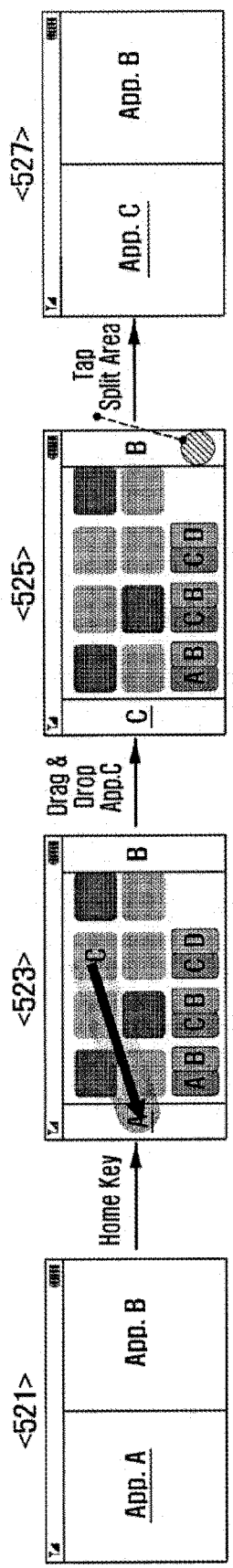

Referring to FIG. 5C, as described before in connection with FIG. 4, in response to activation of user functions, the mobile terminal 100 can divide the screen of the display unit 141 into two divided screen areas, and output two functional view areas App.A and App.B related to the user functions on the divided screen areas as illustrated in screen 521.

Thereafter, the user can enter the "Home" key provided on the mobile terminal 100. In response, the mobile terminal 100 can resize the functional view areas App.A and App.B into functional view areas 'A' and 'B' and place the functional view areas 'A' and 'B' at preset locations, and can output a menu view area corresponding to the "Home" key on the display unit 141. That is, as illustrated in screen 523, the mobile terminal 100 can display the resized functional view area 'A' at a left area on the display unit 141, display the resized functional view area 'B' at a right area, and output the menu view area related to the "Home" key between the functional view area 'A' and the functional view area 'B'. In screen 523, the user can select a function icon 'C' among at least one function icon in the menu view area and move the function icon 'C' to the functional view area 'A' through drag and drop.

In response to movement of the function icon 'C', as illustrated in screen 525, the mobile terminal 100 can replace the functional view area 'A' with the functional view area 'C' related to the function icon 'C'. Thereafter, when the user generates an input signal for tapping a split area in screen 525, the mobile terminal 100 can remove the menu view area and resize the functional view area being output to fit in the corresponding split area of the display unit 141 as illustrated in screen 527. For example, the menu view area is hidden in screen 527; the functional view area 'C' in screen 525 is resized into a functional view area App.C fitting in the corresponding split area in screen 527; and the functional view area 'B' in screen 525 is resized into a functional view area App.B fitting in the corresponding split area in screen 527.

Figure 5D:
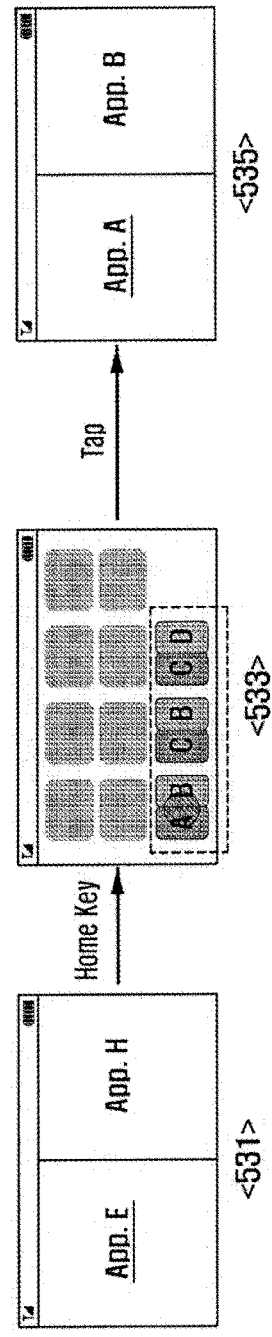

Referring to FIG. 5D, the mobile terminal 100 can replace existing functional view areas with new functional view areas at once through the menu view area. To be more specific, as described before in connection with FIG. 4, in response to activation of user functions, the mobile terminal 100 can divide the screen of the display unit 141 into two divided screen areas, and output two functional view areas App.E and App.H related to the user functions on the divided screen areas as illustrated in screen 531.

The user can cause a menu view area containing at least one function icon to be displayed on the display unit 141. To achieve this, the mobile terminal 100 can provide a special key like the "Home" key. When the user enters the "Home" key, the mobile terminal 100 can display a menu view area containing at least one function icon on the display unit 141 in a full screen format as illustrated in screen 533. As described before, the menu view area can include a dual menu item. A dual menu item can be created and destroyed in a manner selected from the group consisting of automatically and according to user settings. The mobile terminal 100 can provide a special interface that enables the user to create a dual menu item.

When the user generates an input signal for selecting a dual menu item "AB" in the menu view area illustrated in screen 533, the mobile terminal 100 can output two functional view areas App.A and App.B related to the dual menu item "AB" on the divided screen areas as illustrated in screen 535. Here, when the user selects a dual menu item in screen 533, the mobile terminal 100 can directly output a functional view area related to the selected dual menu item as illustrated in screen 535. Alternatively, when the user selects a dual menu item in screen 533 and generates one of a given key signal and touch event for outputting functional view areas related to the selected dual menu item, the mobile terminal 100 can output the functional view areas as illustrated in screen 535.

As described above, the mobile terminal 100 can perform screen transition according to one of the methods selected from the group consisting of selection of an icon in a search view area, movement of an icon in a search view area to a desired split area, output of a menu view area through rearrangement of divided screen areas and selection of an icon in the menu view area, and output of a menu view area through display of divided screen areas and selection of a dual menu item in the menu view area.

Hereinabove, a description is given of the configuration of the mobile terminal 100. A description is also given of divided screen areas and screen transitions. Next, a description is given of a plurality of user interactions using divided screen areas with reference to the drawings.

FIG. 6 illustrates a screen representation for a first example of user interaction, in an exemplary embodiment of the present invention.

In FIG. 6, user interaction is related to a message composition view area. The message composition view area can be displayed on the display unit by any of activating a user menu and selecting a message composition function through the user menu, and by entering a given key associated with message composition. For example, as illustrated in screen 601, when the user selects an information item registered as "Yun" in the phonebook and activates a message composition function, the mobile terminal 100 can output a message composition view area.

When the user touches a zone 61 reserved for more options as illustrated in screen 601, the mobile terminal 100 can display an option view area 63 on the display unit 141 as illustrated in screen 603. The option view area 63 can include a plurality of items related to the message composition view area, selected from the group including "File", "Namecard", "Calendar", "Task", and "Memo". When the user selects the item "File" in the option view area 63, the mobile terminal 100 can display subordinates items of the item "File" on the display unit 141. For example, the mobile terminal 100 can display a subordinate item view area 65 selected from the group including "Add multimedia", "Add subject", "Add attachment", "Save in", "Recipients", "Add test", "Add Cc/Bcc", and "Sending Options". Here, the mobile terminal 100 can display the subordinate item view area 65 of the item "File" in an overlay format on the message composition view area, and arrange the subordinate item view area 65 and the option view area 63 so that they do not overlap with each other.

When the user selects an item "Add Attachment" in the subordinate item view area 65, the mobile terminal 100 can divide the screen of the display unit 141 into split areas and output a first functional view area 62 related to message composition and a second functional view area 64 related to file attachment on the split areas as illustrated in screen 605. When the user selects a folder "Images" in the second functional view area 64, the mobile terminal 100 can display a listing view area 66 containing a list of files in the folder "Images" on the corresponding split area as illustrated in screen 607. Here, display of the second functional view area 64 can be replaced with display of the listing view area 66. When the user selects specific files "Picture1.jpg" and "Picture2.jpg" in the listing view area 66 and selects an icon "Add" for file attachment as illustrated in screen 609, the mobile terminal 100 can display the message composition view area containing the selected files on the display unit 141 in a full screen format as illustrated in screen 611. Here, to clearly indicate the attached files, the mobile terminal 100 can display a file attach view area 67 at a region of the message composition view area. The file attach view area 67 can include information indicating selected files such as "Picture1.jpg" and "Picture2.jpg".

Figure 7A:
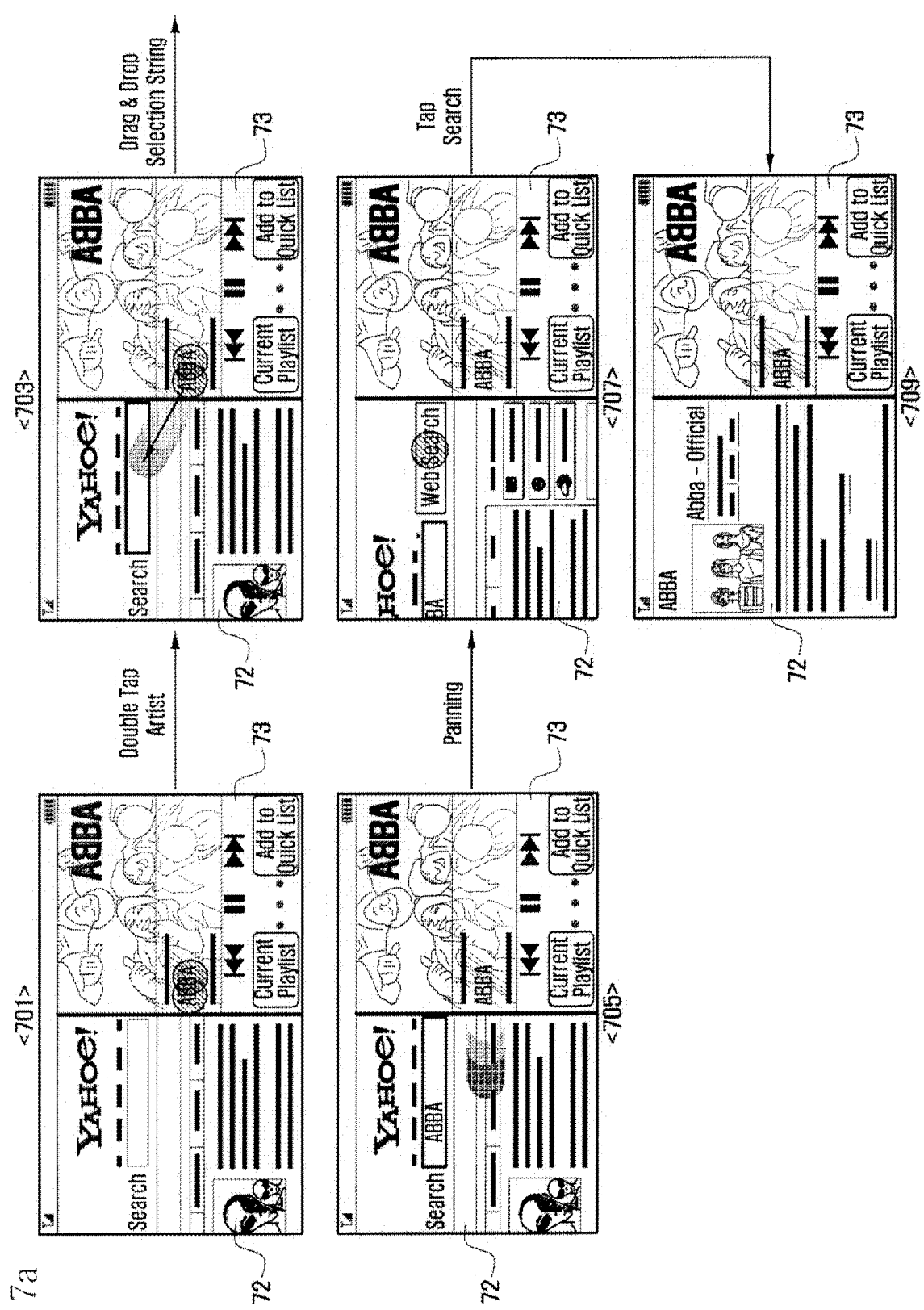
FIGS. 7A, 7B and 7C illustrate screen representations for a second example of user interaction, in an exemplary embodiment of the present invention.
Figure 7B:
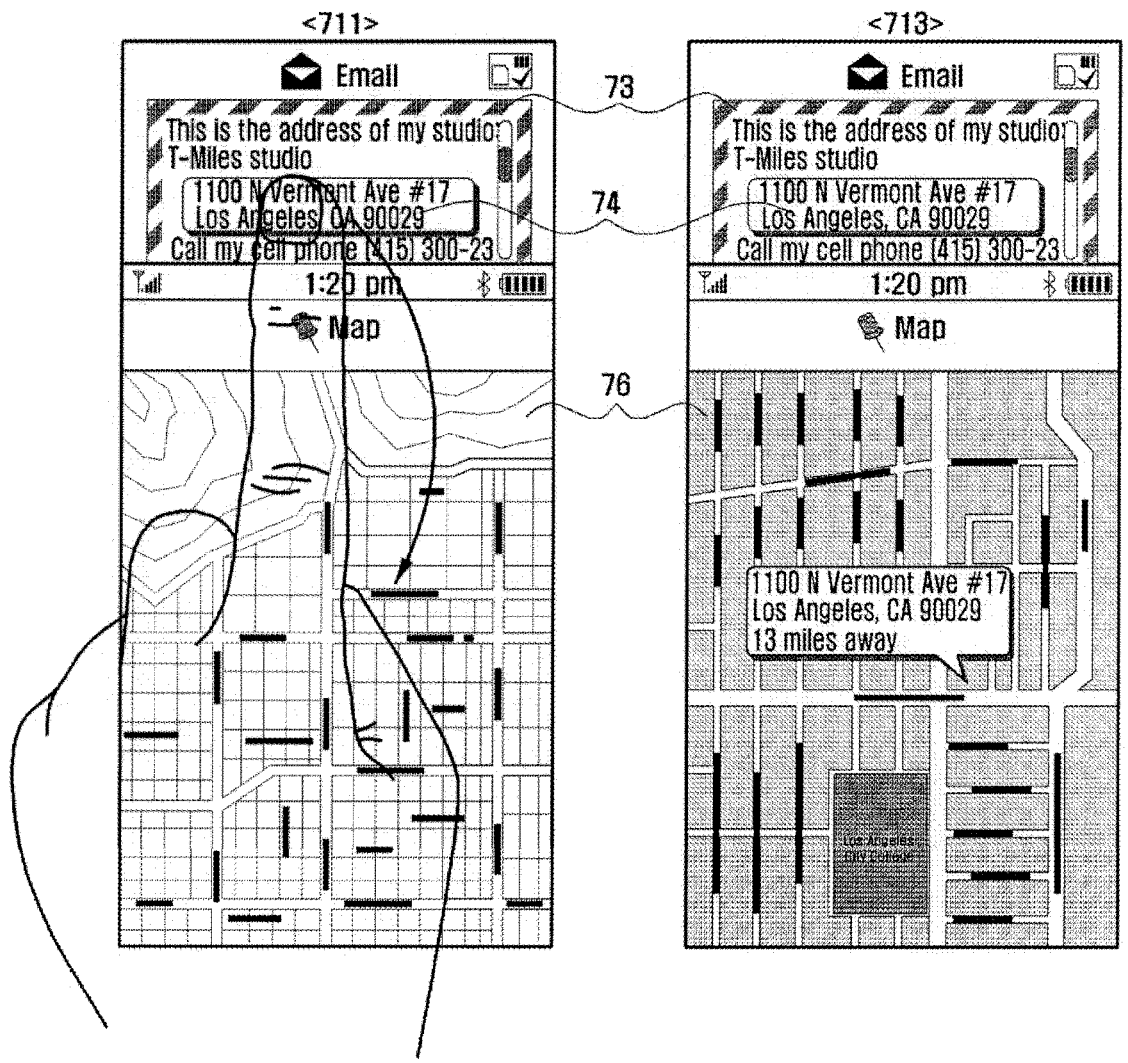
Figure 7C:
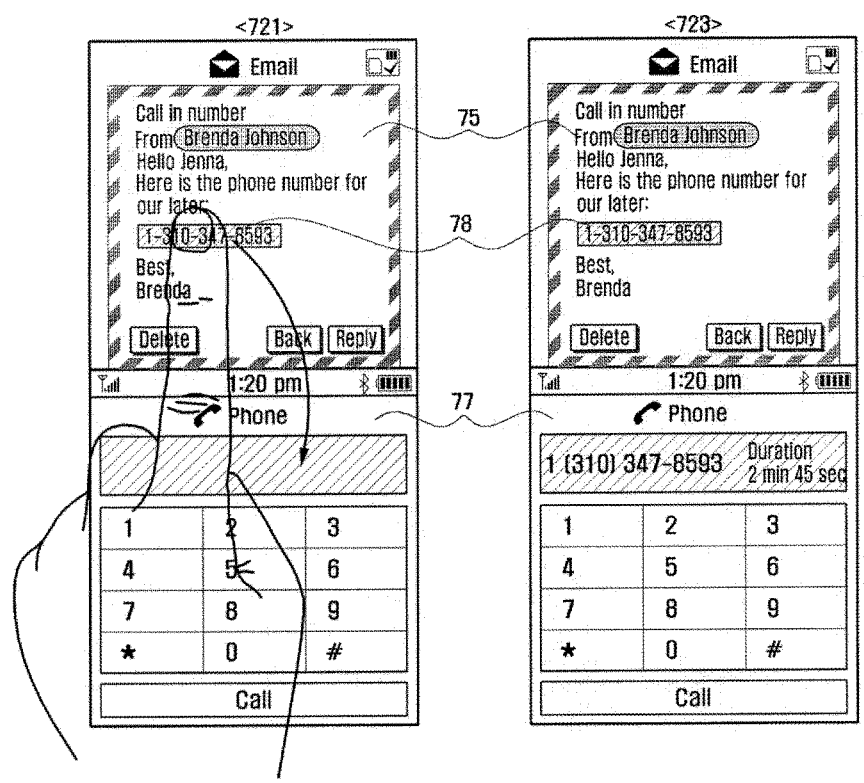

FIGS. 7A to 7C illustrate screen representations for a second example of user interaction, and are related to transferring information between functional view areas, in an exemplary embodiment of the present invention.

Referring to FIG. 7A, the user of the mobile terminal 100 can cause activation of two user functions related to, for example, Web access and music file playback in one of sequentially and in parallel by the use of one of a dual menu item and a single menu item. In response to the user action, the mobile terminal 100 can activate a Web access function and connect to a server using a preset address. After Web connection establishment, the mobile terminal 100 can display a Web access view area 72 for outputting data provided by the server on one divided screen area as illustrated in screen 701. In addition, the mobile terminal 100 can activate a music file player and display a music file play view area 73 related to the music file player on the other divided screen area.

A illustrated in screen 701, the user generates an input signal for selecting artist information "ABBA" in the Web access view area 72, extracts the selected artist information "ABBA" (double tap), and moves the extracted artist information "ABBA" to a search box of the Web access view area 72 (drag and drop) as illustrated in screen 703. Then, the mobile terminal 100 can display the selected information at the search box of the Web access view area 72 as illustrated in screen 705.

When the user generates an input signal "Panning" for shifting the Web access view area 72 at the divided screen area, the touch panel of the display unit 141 generates a corresponding touch event and sends the touch event to the control unit 160. Then, the mobile terminal 100 can shift the Web access view area 72 according to the input signal as illustrated in screen 707. Thereafter, when the user selects an item "Web search" of the Web access view area 72 for searching the Web, the mobile terminal 100 can perform Web search using the artist information input to the search box as a search keyword and outputs Web search results to the Web access view area 72 as illustrated in screen 709. Here, the mobile terminal 100 can send a message containing the artist information input to the search box to a given Web server, and can receive corresponding Web search results from the Web server through the radio frequency unit 110 and output the received Web search results to the display unit 141.

Referring to FIG. 7B, the user can make an activation request for a mail check function of the mobile terminal 100. In response to the user request, the mobile terminal 100 can display a list of received electronic mail on the display unit 141, and, upon selection of an electronic mail, output the contents of the selected electronic mail on a given area of the display unit 141 as illustrated in screen 711. When the user makes an activation request for a map viewing function, the mobile terminal 100 can activate the map viewing function and display a preset map on the display unit 141. Here, the mobile terminal 100 can output an email handling view area 73 related to the mail check function on one divided screen area of the display unit 141, and output a map viewing view area 76 related to the map viewing function on the other divided screen area. Here, the mobile terminal 100 can control the email handling view area 73 and the map viewing view area 76 to have different sizes. That is, when the user generates an input signal through the touch pad 121 for resizing at least one of the email handling view area 73 and the map viewing view area 76, the mobile terminal 100 can adjust the size of at least one of the email handling view area 73 and the map viewing view area 76.

As illustrated in screen 711, the user can select a desired information element of the email handling view area 73. For example, the user can select address information 74 of the email handling view area 73 in a plurality of ways. That is, when the user drags a region where the address information 74 is output and when a block covering the address information 74 is set, the user can select the address information 74 by tapping the block. After selecting the address information 74, the user can move the address information 74 to the map viewing view area 76 by dragging.

Then, the mobile terminal 100 can execute the map viewing function using the address information 74 transferred from the email handling view area 73 to the map viewing view area 76, and output the map of the geographical region indicated by the address information 74 at a given scale on the map viewing view area 76 as illustrated in screen 713. In other words, the mobile terminal 100 can treat the address information 74 transferred from the email handling view area 73 to the map viewing view area 76 as a search word, and invoke the map viewing function on the basis of the address information 74. Then, the mobile terminal 100 can adjust the scale of the map of the geographical region indicated by the address information 74 at a preset value, and display the scale-adjusted map on the map viewing view area 76. Here, the size of the email handling view area 73 and the map viewing view area 76 can be adjusted according to one of an input signal from the input unit 120 and according to a touch event from the touch screen 140. For example, the boundary region between the email handling view area 73 and the map viewing view area 76 can be moved upwards or downwards according to a touch and drag event, and the email handling view area 73 and the map viewing view area 76 can be adjusted in size according to movement of the boundary region. In response to size adjustment of a view area, one of additional information can be displayed in the view area, and a portion of information displayed on the view area can be hidden.

Referring to FIG. 7C, when the user make an electronic mail request, the mobile terminal 100 can activate an electronic mail function and output a list of electronic mail. Thereafter, when the user selects a specific electronic mail, the mobile terminal 100 can output the contents of the selected electronic mail to the email handling view area 75 on the display unit 141 as illustrated in screen 721. When the user generates an input signal for making a call while the electronic mail function is activated, the mobile terminal 100 can output a dialing view area 77 for call making on the display unit 141.

The user can generate an input signal for selecting specific information such as a phone number 78 in the email handling view area 75. That is, the user can select the phone number 78 in the email handling view area 75 by dragging or tapping. After selecting the phone number 78, the user can transfer the phone number 78 to the dialing view area 77 by dragging.

Then, the mobile terminal 100 can display the phone number 78 transferred by the user in the dialing view area 77 as depicted by screen 723. Thereafter, the mobile terminal 100 can one of automatically make a call using the phone number 78, and can make a call using a newly dialed phone number, if present.

As described above, the mobile terminal 100 can output a plurality of functional view areas on divided screen areas of the display unit 141 according to a user request. The mobile terminal 100 enables the user to select an information item displayed on a first functional view area and to move the selected information item to a second functional view area, and invokes the function associated with the second functional view area using the transferred information item. In the case of the example illustrated in FIG. 7B, the user transfers the address information 74 to the map viewing view area 76. When the address information 74 does not match geographical information stored in the storage unit 150, the mobile terminal 100 can output a message indicating "not found". In the case of FIG. 7C, the user transfers the phone number 78 to the dialing view area 77. When the phone number 78 is wrong due to the presence of one of a special character and other invalid character, the mobile terminal 100 can output an error message indicating such a situation.

FIG. 8 illustrates a screen representation for a third exemplary embodiment of user interaction according to the present invention that is embodies copying and transferring information between functional view areas.

Referring to FIG. 8, when the user generates an input signal for activating a Web access function, the mobile terminal 100 can activate the Web access function. Here, the mobile terminal 100 can connect to a server using one of a preset address and an input address, and display a Web access view area 81 for outputting data provided by the server on the display unit 141 as illustrated in screen 801. When the user generates an input signal for activating a memo function, the mobile terminal 100 can divide the screen of the display unit 141 into split areas, display the Web access view area 81 on one split area, and display a memo function view area 82 on the other split area.

When the user generates an input signal for activating a memo create function in the memo function view area 82, the mobile terminal 100 can output a memo writing view area 83 on the display unit 141 as illustrated in screen 803. To achieve this, the mobile terminal 100 can provide one of a menu item for memo writing and output a memo writing icon to the memo function view area 82, as illustrated in screen 801.

When the user selects an information item displayed in the Web access view area 81 and transfers the selected information item to the memo writing view area 83, as illustrated in screen 805, the mobile terminal 100 can display the transferred information item in the memo writing view area 83 as illustrated in screen 807. Here, the user can select a piece of information in the Web access view area 81 by generating a touch drag event.

Thereafter, as illustrated in screen 807, the mobile terminal 100 can display a color selection bar 85 to enable the user to set the color of the memo writing view area 83. When the user selects a color of the color selection bar 85 through a tap, the mobile terminal 100 can set the color of the memo writing view area 83 to the selected color as illustrated in screen 809. When the user selects a "save" icon of the memo writing view area 83, the mobile terminal 100 can return to the memo function view area 82 as illustrated in screen 811. Here, the memo function view area 82 includes a new memo 86 written by the memo writing function.

Figure 9:
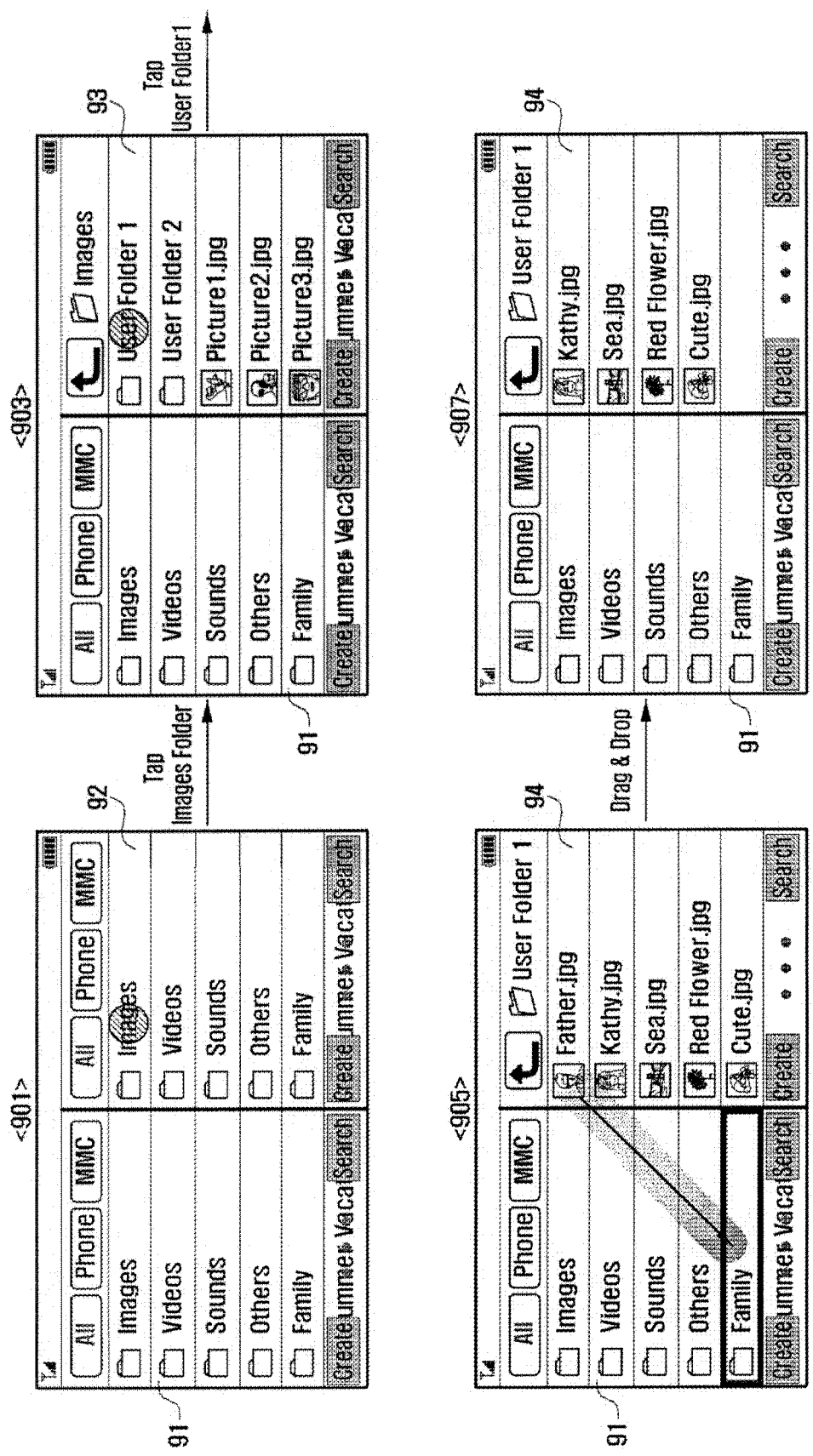
FIG. 9 illustrates a screen representation for a fourth example of user interaction, in an exemplary embodiment of the present invention.

FIG. 9 illustrates a screen representation for a fourth exemplary embodiment of user interaction according to the present invention of file transfer between functional view areas.

Referring to FIG. 9, when the user generates an input signal for activating a file search function, the mobile terminal 100 can display a first file search view area 91 on the display unit 141 as illustrated in screen 901. When the user generates an input signal for activating another file search function, the mobile terminal 100 can divide the screen of the display unit 141 into split areas, display the first file search view area 91 on one split area, and display a second file search view area 92 related to the file search function activated later on the other split area.

When the user selects an item "Images" in the second file search view area 92, the mobile terminal 100 can display a first listing view area 93 containing subordinate items of the selected item "Images" including any of "User Folder 1", "User Folder 2", "Picture1.jpg", "Picture2.jpg" and "Picture3.jpg" as illustrated in screen 903. When the user selects a folder item "User Folder 1" in the first listing view area 93, the mobile terminal 100 can display a second listing view area 94 containing subordinate items of the selected folder item "User Folder 1" as illustrated in screen 905. The second listing view area 94 can contain items including any of "Father.jpg", "Kathy.jpg", "Sea.jpg", "Fed Flower.jpg", and "Cute.jpg". The user can generate an input signal for moving a selected item in the second listing view area 94 to a folder item "Family" in the first file search view area 91. For example, the user can generate an input signal for selecting an item "Father.jpg" in the second listing view area 94 and for moving the selected item to the folder item "Family" in the first file search view area 91 through drag. Then, the mobile terminal 100 can move the selected item "Father.jpg" from the folder "User Folder 1" displayed in the first listing view area 93 to the folder "Family" displayed in the first file search view area 91 as illustrated in screen 907. The mobile terminal 100 can then remove the item "Father.jpg" from the folder "User Folder 1" (i.e. from the second listing view area 94).

Figure 10:
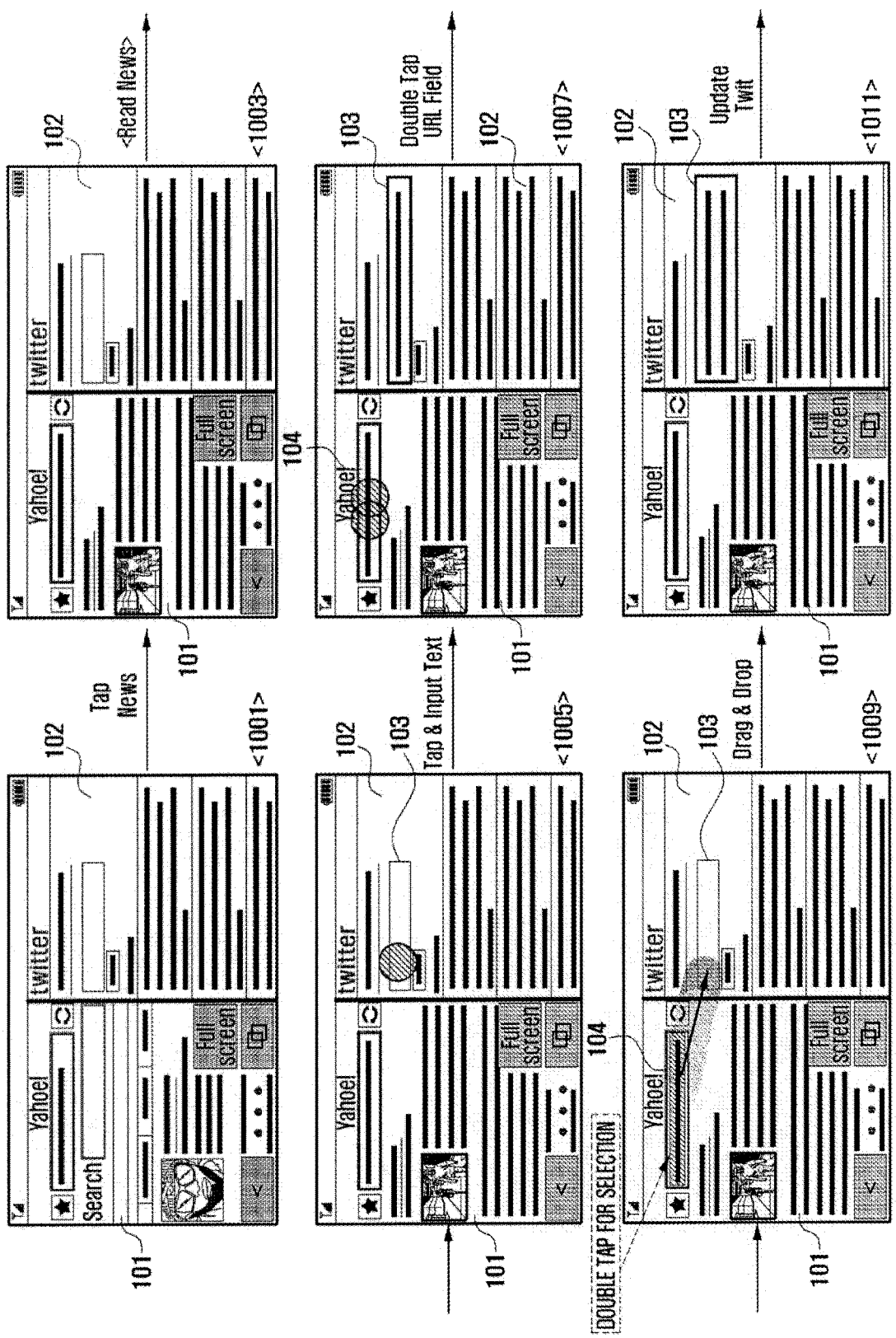
FIGS. 10 and 11 illustrate screen representations for a fifth example of user interaction, in an exemplary embodiment of the present invention.

FIG. 10 illustrates a screen representation for a fifth exemplary of user interaction according to the present invention, of interworking between functional view areas supporting Web access.

Referring to FIG. 10, when the user generates an input signal for activating a Web access function, the mobile terminal 100 can connect to a Web server using one of a preset address and an input address and display a Web access view area for outputting data provided by the Web server on the display unit 141. When the user generates an input signal for activating the "Twitter" function, the mobile terminal 100 can connect to a Twitter server and display a Twitter view area for outputting data provided by the Twitter server on the display unit 141. Hence, as illustrated in screen 1001, the mobile terminal 100 can display a Web access view area 101 and a Twitter view area 102 on corresponding divided screen areas of the display unit 141.

The user can browse news in the Web access view area 101 by generating a touch event such as a tap. For example, when the user selects a link "Health care", the mobile terminal 100 can send the link selection information to the Web server, receive a news item related to "Health care" from the Web server, and output the received news item in the Web access view area 101, as illustrated in screen 1003.

As illustrated in screen 1005, when the user select an update field 103 in the Twitter view area 102, the mobile terminal 100 can allow the user to enter an input in the update field 103. That is, the user can generate an input signal for entering a text string "Health care yahoo news is here!" in the update field 103 as illustrated in screen 1007. The user can generate an input signal for selecting, for example, a URL address 104 displayed in the Web access view area 101 through a double tap, and for entering the selected URL address 104 in the update field 103 of the access view area 102 through a drag event, as illustrated in screen 1009.

The mobile terminal 100 can enter both the text string (screen 1005) and the URL address 104 (screen 1009) in the update field 103 as illustrated in screen 1011. Thereafter, when the user generates an input signal for uploading the input information to the Twitter server, the mobile terminal 100 can upload the input information to the Twitter server.

In FIG. 10, information obtained from the Web access view area is applied to the Twitter view area. Information obtained from the Twitter view area can also be applied to the Web access view area as described below in connection with FIG. 11.

Figure 11:
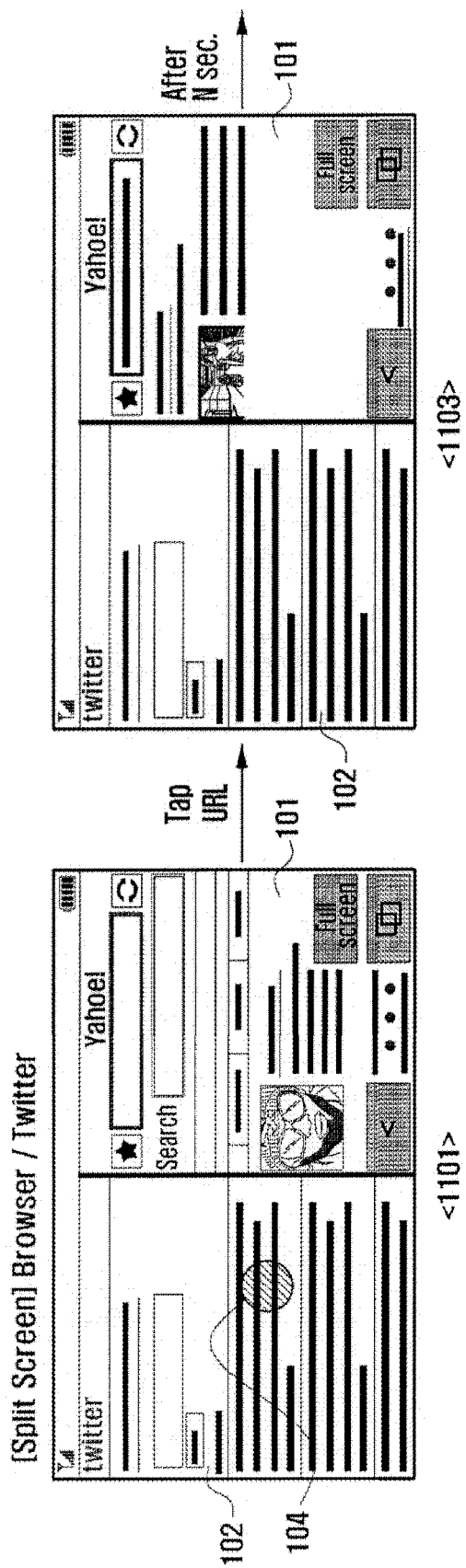

Referring to FIG. 11, when the user activates a Web access function and a Twitter function, the mobile terminal 100 can display a Twitter view area 102 and a Web access view area 101 on the corresponding divided screen areas of the display unit 141 as illustrated in screen 1101.

When the user generates an input signal (a touch event) for selecting, for example, a URL address 104 displayed in the Twitter view area 102, the mobile terminal 100 can display Web data received from a Web server indicated by the URL address 104 in the Web access view area 101 as illustrated in screen 1103.

Figure 12:
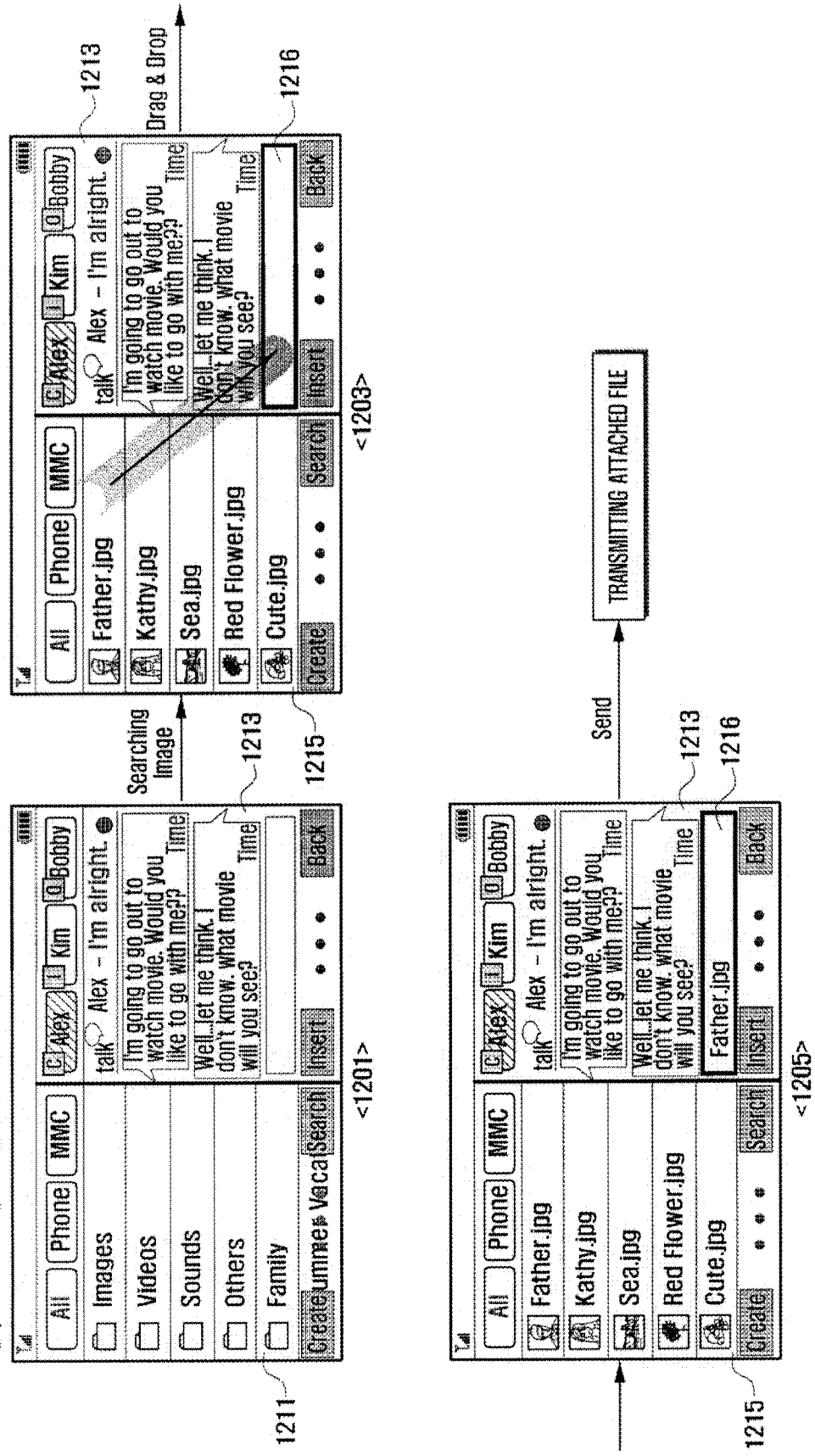
FIG. 12 illustrates a screen representation for a sixth example of user interaction, in an exemplary embodiment of the present invention.

FIG. 12 illustrates a screen representation for a sixth exemplary embodiment of user interaction according to the present invention, of interaction between a file search function and a twitter function.

Referring to FIG. 12, when the user generates an input signal for selecting a file search function, the mobile terminal 100 can display a file search view area 1211 related to the file search function on the display unit 141. When the user generates an input signal for activating the Twitter function, the mobile terminal 100 can connect to a given Twitter server and display a Twitter view area 1213 for outputting data provided by the Twitter server on the display unit 141. Hence, as illustrated in screen 1201, the mobile terminal 100 can display the file search view area 1211 and the Twitter view area 1213 on the corresponding divided screen areas of the display unit 141.

When the user generates an input signal for selecting, for example, a folder "Images", the mobile terminal 100 can display on the display unit 141 a listing view area 1215 containing subordinate items of the folder "Images" including any of "Father.jpg", "kathy.jpg", "Sea.jpg", "Red flower.jpg" and "cute.jpg", as illustrated in screen 1203. When the user generates an input signal for selecting, for example, an item "Father.jpg" and moving the item "Father.jpg" to an upload field 1216 of the Twitter view area 1213, the mobile terminal 100 can enter the item "Father.jpg" in the upload field 1216 of the Twitter view area 1213 as illustrated in screen 1205. Here, the mobile terminal 100 notifies the user of the upload file by outputting information on the uploaded file (i.e., "Father.jpg").

Thereafter, in response to a sending request, the mobile terminal 100 can transmit the upload file to the Twitter server.

Figure 13:
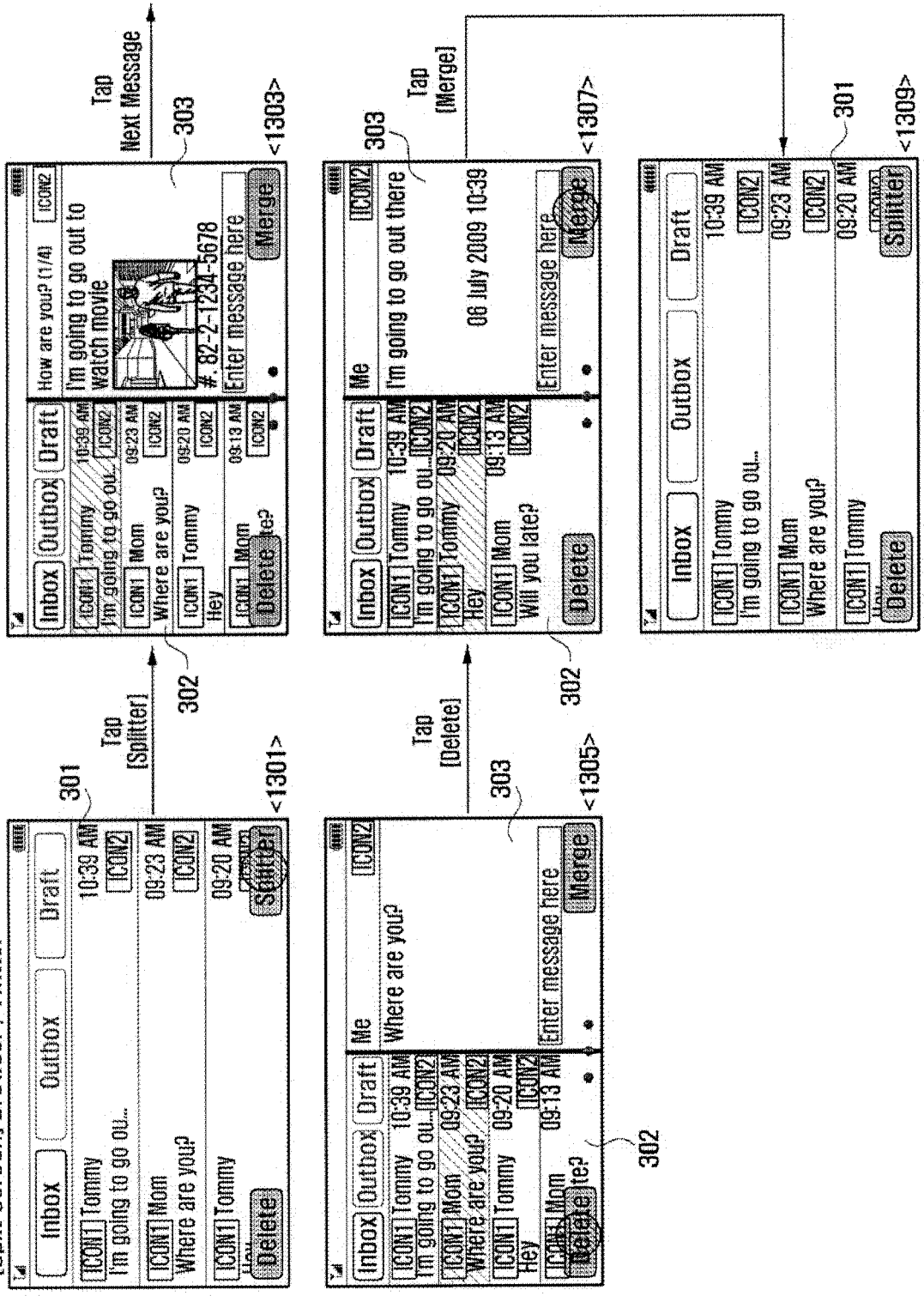
FIG. 13 illustrates a screen representation for a seventh example of user interaction, in an exemplary embodiment of the present invention.

FIG. 13 illustrates a screen representation for a seventh exemplary embodiment of user interaction according to the present invention for a Twitter function with divided screen areas.

Referring to FIG. 13, when the user generates an input signal for activating the "Twitter" function, the mobile terminal 100 can connect to a Twitter server using a preset Twitter address and display a Twitter view area 301 for outputting data provided by the Twitter server on the display unit 141. The Twitter view area 301 can contain a list of messages registered with the Twitter server. Here, the mobile terminal 100 can provide a menu containing one of an icon and a key for generating an input signal for activating the Twitter function to permit the user to utilize the Twitter function.

As illustrated in screen 1301, the mobile terminal 100 can display a "Splitter" icon for divided screen area formation at a corner of the screen. When the user generates an input signal for selecting the "Splitter" icon (through a tap), the mobile terminal 100 can divide the screen into divided screen areas and display a first Twitter view area 302 and a second Twitter view area 303 in the corresponding divided screen areas as illustrated in screen 1303. Here, the first Twitter view area 302 can be a resized version of the Twitter view area 301 illustrated in screen 1301, and the second Twitter view area 303 can be a viewing view area related to a message selected by one of a preset default and the user in the first Twitter view area 302. Thus, when the user generates an input signal for selecting another message in the first Twitter view area 302, the mobile terminal 100 can output the contents of the newly selected message to the second Twitter view area 303 as illustrated in screen 1305.

As illustrated in screen 1305, when the user generates an input signal for deleting the selected message by selecting a "Delete" icon in the first Twitter view area 302, the mobile terminal 100 can delete the selected message and update the first Twitter view area 302 by deleting the selected message.

As illustrated in screen 307, the mobile terminal 100 can display a "Merge" icon at a corner of the display unit 141 for returning to a full screen format. When the user generates an input signal for selecting the "Merge" icon, the mobile terminal 100 can end divided screen area formation and enlarge the first Twitter view area 302 into the Twitter view area 301 as illustrated in screen 1309. With enlargement, existing images and text in the first Twitter view area 302 can be expanded and new images and text can be added to the Twitter view area 301.

Hereinabove, a description is given of the method of supporting divided screen areas. When user functions are activated in response to user input signals, the screen is divided into divided screen areas on the basis of the properties of the user functions, temporal relations between the user functions, and explicit requests for divided screen area formation, and functional view areas including view area first and second functional view area are displayed on the corresponding divided screen areas.

In the above description, several exemplary forms of user interaction according to the present invention are illustrated and described. However, the present invention is not limited to these. For an effective user interface, additional forms of user interaction including automatic transition between the divided screen areas and the full screen can also be supported according to one of the design and user settings.

Although not shown, if necessary, the mobile terminal 100 can further include at least one of a short-range communication module for short-range communication, a camera module for capturing still and moving images of a target object, a data communication interface based on wired and wireless communication, an Internet communication module for Internet access, and a digital broadcast receiving module. With the digital convergence trend, it should be apparent to those skilled in the art that the mobile terminal 100 of the present invention can further include a unit comparable to the above-described units, and one unit of the mobile terminal 100 can be one of removed and replaced with another unit.

The mobile terminal of the present invention can be a touch-enabled device, and can be any information and communication appliance and multimedia appliance, including any of a mobile communication terminal, a portable multimedia player (PMP), a personal digital assistant (PDA), a music player like an MP3 player, a portable game console, a smart phone, a notebook computer, or a handheld computer.

The above-described methods according to the present invention can be realized in hardware or via the execution of software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which can occur to those skilled in the art, will still fall within the spirit and scope of the present invention as defined in the appended claims.

What is claimed is:

1. An electronic device comprising:
   a display; and
   a processor operatively coupled to the display, the processor configured to:
      control the display to display first information related to a first application program on the display;
      receive a first input related to a display division;
      divide the display into a first region and a second region;
      control the display to display the first information related to the first application program over an entirety of the first region of the display and second information related to a second application program over an entirety of the second region of the display;
      receive a second input related to a change of the second application program in the first region;
      control the display to display, in response to the second input, an application program list to overlap at least part of the first information displayed in the first region;
      receive a third input related to a third application program included in the displayed application program list; and
      control the display to replace, in response to the third input, the second information displayed in the second region with third information related to the third application program,
   wherein the application program list includes a first object of the first application program, a second object of the second application program, and a third object of the third application program, and
   wherein the second object included in the application list is displayed differently from the third object.

2. The electronic device according to claim 1, wherein the application program list is displayed in a third region of the display different from the first region and the second region.

3. The electronic device according to claim 1, wherein the third input includes touch input related to the third object.

4. The electronic device according to claim 1, wherein the processor is further configured to remove the display of the application program list after the third input is received.

5. The electronic device according to claim 1, wherein the processor is further configured to remove the display of the application program list upon display of information related to the third application program.

6. A method for an electronic device, comprising:
   displaying first information related to a first application program on a display;
   receiving a first input related to a display division;
   dividing the display into a first region and a second region;
   displaying the first information related to the first application program over an entirety of the first region of the display and second information related to a second application program over an entirety of the second region of the display;
   receiving a second input related to a change of the second application program in the first region;
   displaying, in response to the second input, an application program list to overlap at least part of the first information displayed in the first region;
   receiving a third input related to a third application program included in the displayed application program list; and
   replacing, in response to the third input, the second information displayed in the second region with third information related to the third application program,
   wherein the application program list includes a first object of the first application program, a second object of the second application program, and a third object of the third application program, and
   wherein the second object included in the application list is displayed differently from the third object.

7. The method according to claim 6, wherein the application program list is displayed in a third region of the display different from the first region and the second region.

8. The method according to claim 6, wherein the third input includes touch input related to the third object.

9. The method according to claim 6, further comprising:
   removing the display of the application program list after the third input is received.

10. The method according to claim 6, further comprising:
    removing the display of the application program list upon display of information related to the third application program.

* * * * *